US011529933B2

(12) United States Patent
Kim

(10) Patent No.: US 11,529,933 B2
(45) Date of Patent: Dec. 20, 2022

(54) SENSING APPARATUS

(71) Applicants: HYUNDAI MOTOR COMPANY, Seoul (KR); KIA MOTORS CORPORATION, Seoul (KR)

(72) Inventor: Min Han Kim, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 385 days.

(21) Appl. No.: 16/937,073

(22) Filed: Jul. 23, 2020

(65) Prior Publication Data

US 2021/0162958 A1 Jun. 3, 2021

(30) Foreign Application Priority Data

Nov. 29, 2019 (KR) .................. 10-2019-0156362

(51) Int. Cl.
*B60S 1/56* (2006.01)
*B60S 1/38* (2006.01)
*B60S 1/52* (2006.01)
*G02B 27/00* (2006.01)

(52) U.S. Cl.
CPC .............. *B60S 1/56* (2013.01); *B60S 1/3805* (2013.01); *B60S 1/3862* (2013.01); *B60S 1/524* (2013.01); *G02B 27/0006* (2013.01)

(58) Field of Classification Search
CPC ........ B60S 1/56; B60S 1/3805; B60S 1/3862; B60S 1/524; G02B 27/0006
See application file for complete search history.

(56) References Cited

U.S. PATENT DOCUMENTS

2019/0136988 A1* 5/2019 Mizuno ................. F16K 11/076

FOREIGN PATENT DOCUMENTS

| KR | 10-2006-0070315 A | 6/2006 |
| KR | 10-2007-0019593 A | 2/2007 |
| KR | 2009-0019434 A | 2/2009 |
| KR | 20110008126 A | 1/2011 |
| KR | 101083823 B1 | 11/2011 |
| KR | 101125709 B1 | 3/2012 |
| KR | 20120110389 A | 10/2012 |
| KR | 20130046124 A | 5/2013 |
| KR | 20130109311 A | 10/2013 |
| KR | 20140069928 A | 6/2014 |
| KR | 20150126148 A | 11/2015 |
| KR | 20160050737 A | 5/2016 |

* cited by examiner

*Primary Examiner* — Andrew A Horton
(74) *Attorney, Agent, or Firm* — Morgan, Lewis & Bockius LLP

(57) ABSTRACT

A sensing apparatus is provided. The sensing apparatus may include: a casing; a sensor assembly mounted in the casing; and a wiper assembly removing an outside material attached to the sensor assembly. The sensor assembly includes a sensor module and a sensor housing surrounding the sensor module, and the sensor housing is made of a transparent material. The sensor housing is rotatably mounted in the casing. The sensor housing is rotatably supported with respect to a hollow shaft in the casing, and the hollow shaft is mounted in the casing.

18 Claims, 29 Drawing Sheets

SENSING APPARATUS

CROSS-REFERENCE TO RELATED APPLICATION

The present application claims priority to and the benefit of Korean Patent Application No. 10-2019-0156362, filed on Nov. 29, 2019, which is incorporated herein in its entirety by reference.

TECHNICAL FIELD

The present disclosure relates to a sensing apparatus having a self-cleaning ability.

BACKGROUND

The statements in this section merely provide background information related to the present disclosure and may not constitute prior art.

Vehicles are equipped with various sensors, cameras, electronic devices, and the like in order to improve vehicle safety technology and driver's convenience. These days, research and development on technologies, such as advanced driver assistance system (ADAS) and autonomous vehicles, are actively being conducted.

In order to effectively achieve improvements in the vehicle safety technology and the driver's convenience, it is necessary to accurately recognize the environments of the vehicle such as its surrounding terrain, nearby vehicles, pedestrians, and road conditions when the vehicle is driving or is parked. To this end, an object sensing system using an optical sensor such as a camera, a radio detection and ranging (radar) sensor, and/or a light detection and ranging (lidar) sensor may be mounted on a front windshield, a back windshield, a front bumper, a rear bumper, a side mirror, a roof, and/or the like of the vehicle. For example, a rear-view camera, an around view monitor (AVM), a lane keeping assist system (LKAS), a camera mirror system (CMS), and an optical sensor such as lidar for autonomous driving are not only used to show the surrounding environment/situation, but also are used to provide driving assistance functions such as steering, avoidance, and emergency braking through obstacle recognition.

However, the optical sensor mounted on the exterior of the vehicle may be affected by various foreign materials (condensation, moisture, mud, vinyl, insects, etc.) attached to a surface of the optical sensor when it snows or rains. Such foreign materials may cause deterioration of sensing performance such as out-focusing and sensor misrecognition, making it difficult to secure safety during driving or parking, and as a result, the possibility of accidents may increase.

In addition, when the optical sensor is mounted on the front windshield of the vehicle, it may be indirectly cleaned by the operation of a wiper. However, there is no technology to actively clean the optical sensor mounted on the front bumper, the rear bumper, the back windshield, the roof, and/or the like.

The above information described in this background section is provided to assist in understanding the background of the inventive concept, and may include any technical concept which is not considered as the prior art that is already known to those skilled in the art.

SUMMARY

An aspect of the present disclosure provides a sensing apparatus with a self-cleaning ability, capable of actively removing a foreign material attached to a sensor assembly.

According to an aspect of the present disclosure, a sensing apparatus may include: a casing; a sensor assembly mounted in the casing; and a wiper assembly removing a foreign material attached to the sensor assembly.

The sensor assembly may include a sensor module and a sensor housing surrounding the sensor module, and the sensor housing may be made of a transparent material.

The sensor housing may be rotatably mounted in the casing.

The sensor housing may be rotatably supported with respect to a hollow shaft in the casing, and the hollow shaft may be mounted in the casing.

The sensor module may be coupled to the hollow shaft, and the hollow shaft may have a cavity.

The hollow shaft may have a first air vent communicating with an interior space of the casing, and a second air vent communicating with a cavity of the sensor housing, and the first air vent and the second air vent may communicate with each other through the cavity of the hollow shaft.

The sensing apparatus may further include a heating wire mounted on at least one of the hollow shaft and the sensor module.

The casing may have a drain hole through which the foreign material removed by the wiper assembly is discharged.

The wiper assembly may include a wiper removing the foreign material attached to a surface of the sensor housing, and a wiper frame on which the wiper is mounted.

The wiper frame may have a drain slot through which the foreign material removed by the wiper is discharged.

The sensing apparatus may further include a spray mechanism spraying a cleaning fluid to the sensor housing, and the wiper frame may have an opening through which the cleaning fluid sprayed by the spray mechanism passes.

The wiper assembly may include a plurality of wipers arranged in a rotation direction of the sensor housing.

The wiper frame may extend in a circumferential direction of the sensor housing, and the wiper frame may be spaced apart from an exterior surface of the sensor housing in a radial direction.

The casing may have a pressing projection which presses the wiper toward the sensor housing.

The sensor module may have a lens for securing a viewing angle, and the casing may have an opening with which the lens is aligned. A diameter of the opening may be larger than a diameter of the lens.

The sensing apparatus may further include a glare shutter disposed around the lens of the sensor module, and the glare shutter may be an inclined wall which is inclined from the lens toward an outside of the casing.

The glare shutter may include an internal shutter located inside the sensor housing, and an external shutter located outside the sensor housing.

The sensor module may include a plurality of sensor modules which are arranged in series or in parallel in the sensor housing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
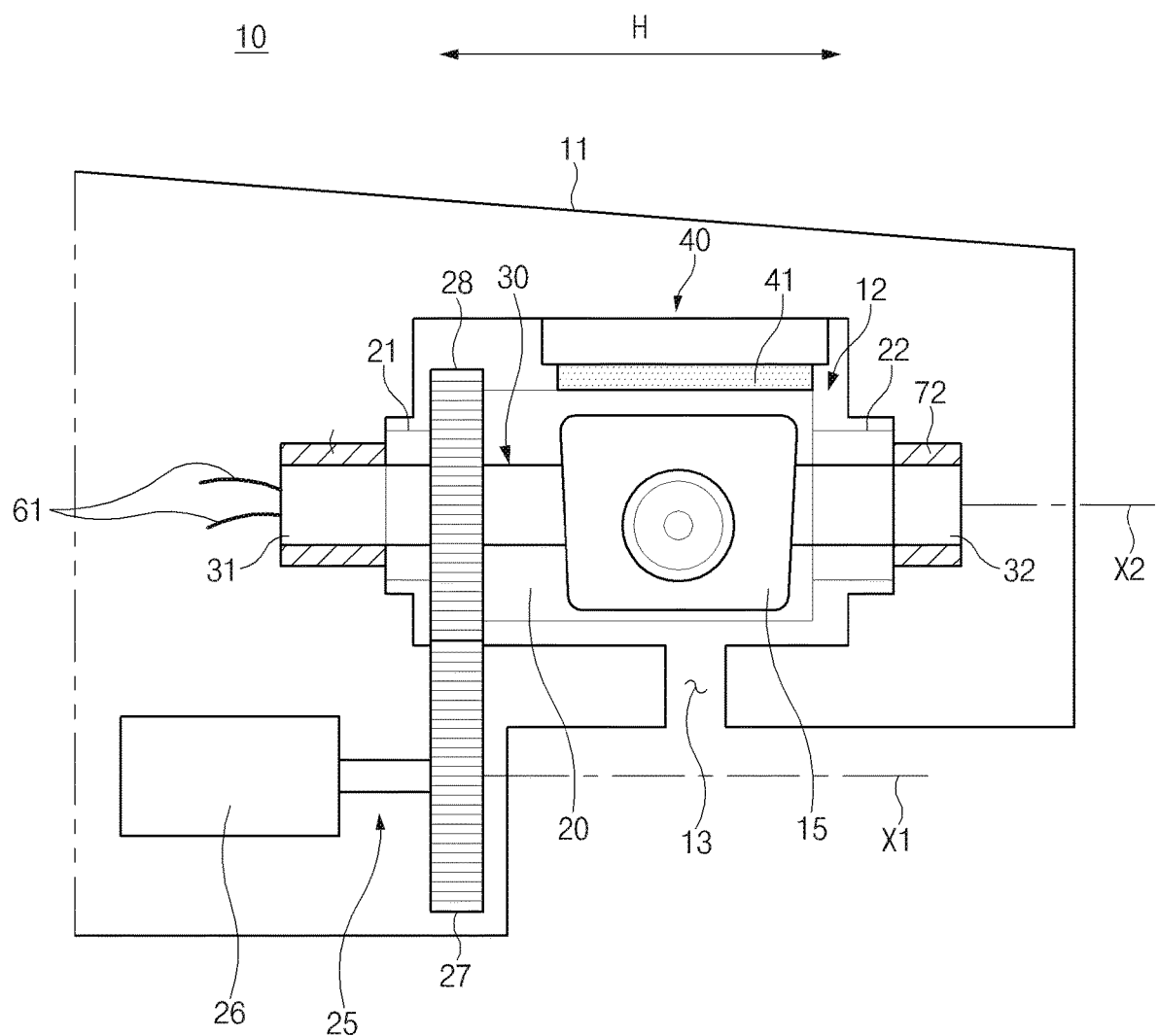
FIG. 1 illustrates a schematic view of a sensing apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in some forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
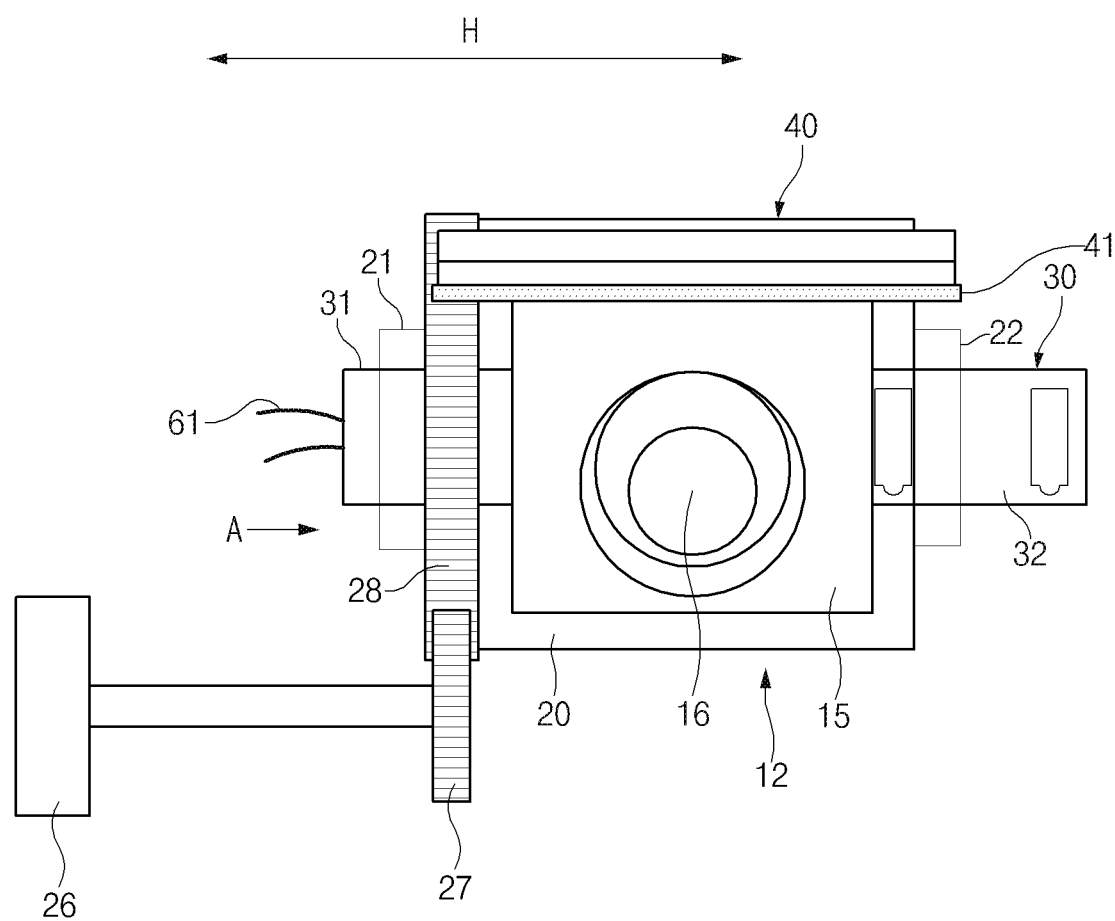
FIG. 2 illustrates a sensor assembly of a sensing apparatus in one form of the present disclosure.
Figure 3:
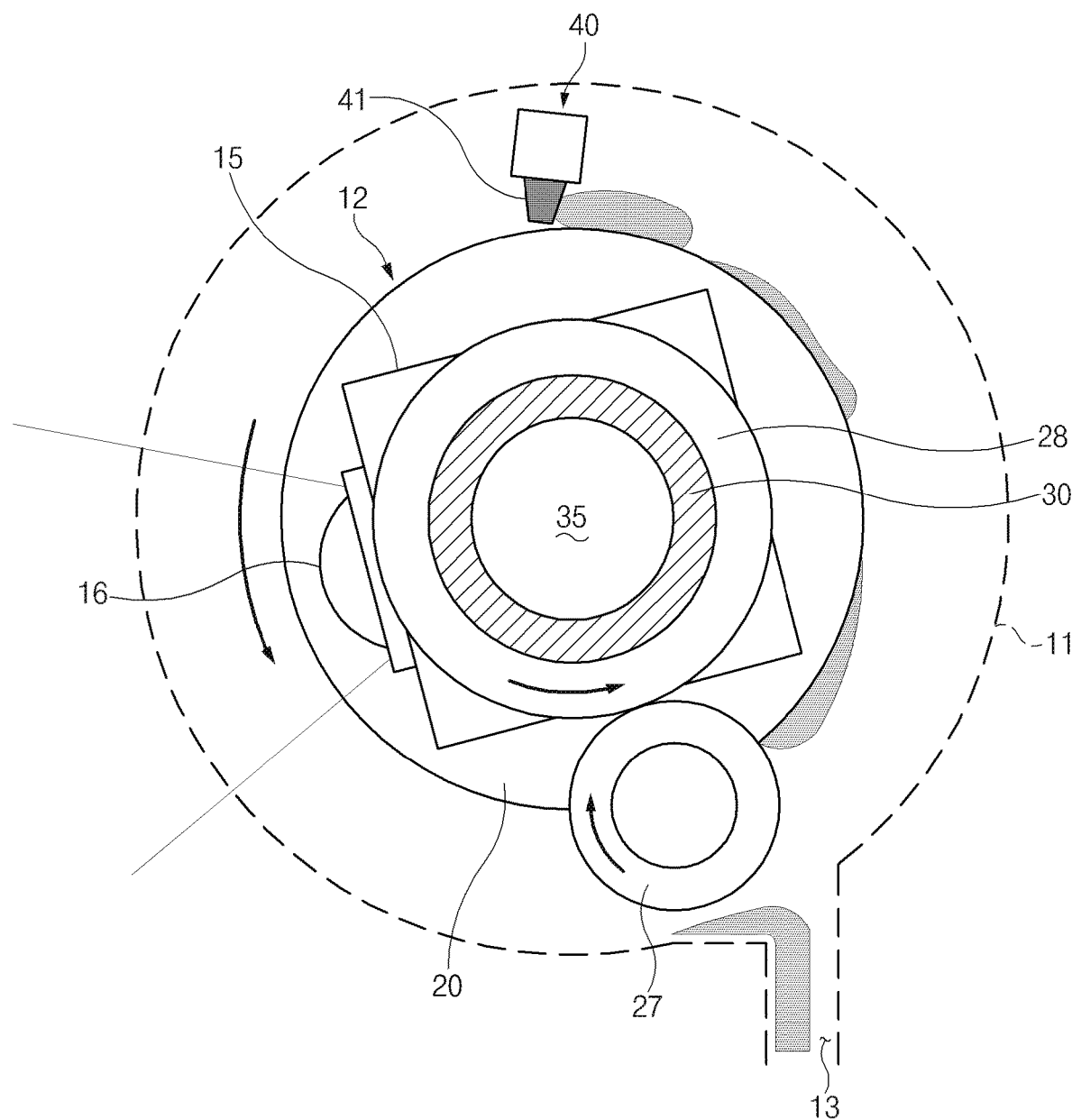
FIG. 3 illustrates a view which is viewed from a direction indicated by arrow A of FIG. 2.

Referring to FIGS. 1 to 3, a sensing apparatus 10, in some forms of the present disclosure, may include a sensor assembly 12 mounted in a casing 11, and a wiper assembly 40 removing a foreign material such as a blockage or sticky material attached to the sensor assembly 12.

The sensor assembly 12 may include a sensor module 15 and a sensor housing 20 surrounding the sensor module 15. For example, the sensor module 15 may be a module including an optical sensor such as a camera, a radio detection and ranging (radar) sensor, and/or a light detection and ranging (lidar) sensor. The sensor module 15 may have a lens 16 to secure a predetermined viewing angle.

The sensor module 15 may be coupled to a hollow shaft 30. The hollow shaft 30 may pass through the sensor module 15. Alternatively, two hollow shafts 30 may be coupled to both sides of the sensor module 15.

The sensor housing 20 may be made of a resin material and the like. The sensor module 15 may be located within the sensor housing 20 so that the sensor module 15 may be protected by the sensor housing 20. The sensor housing 20 may be rotatably supported with respect to the hollow shaft 30, and the hollow shaft 30 may be fixed to the casing 11.

In some forms of the present disclosure, the plurality of sensor modules (not shown) may be arranged in series or in parallel in the sensor housing 20.

The wiper assembly 40 may be disposed around the sensor assembly 12. The wiper assembly 40 may have at least one wiper 41 wiping a surface of the sensor housing 20.

The casing 11 may have an interior space in which the sensor assembly 12, the hollow shaft 30, and the wiper assembly 40 are received. The casing 11 may have a drain hole 13 through which the foreign material removed from the surface of the sensor housing 20 by the wiper assembly 40 is discharged. The drain hole 13 may be formed in a lower portion of the casing 11, especially, the bottom of the casing 11, so that the foreign material may be easily discharged through the drain hole 13 due to its own weight.

Figure 4:
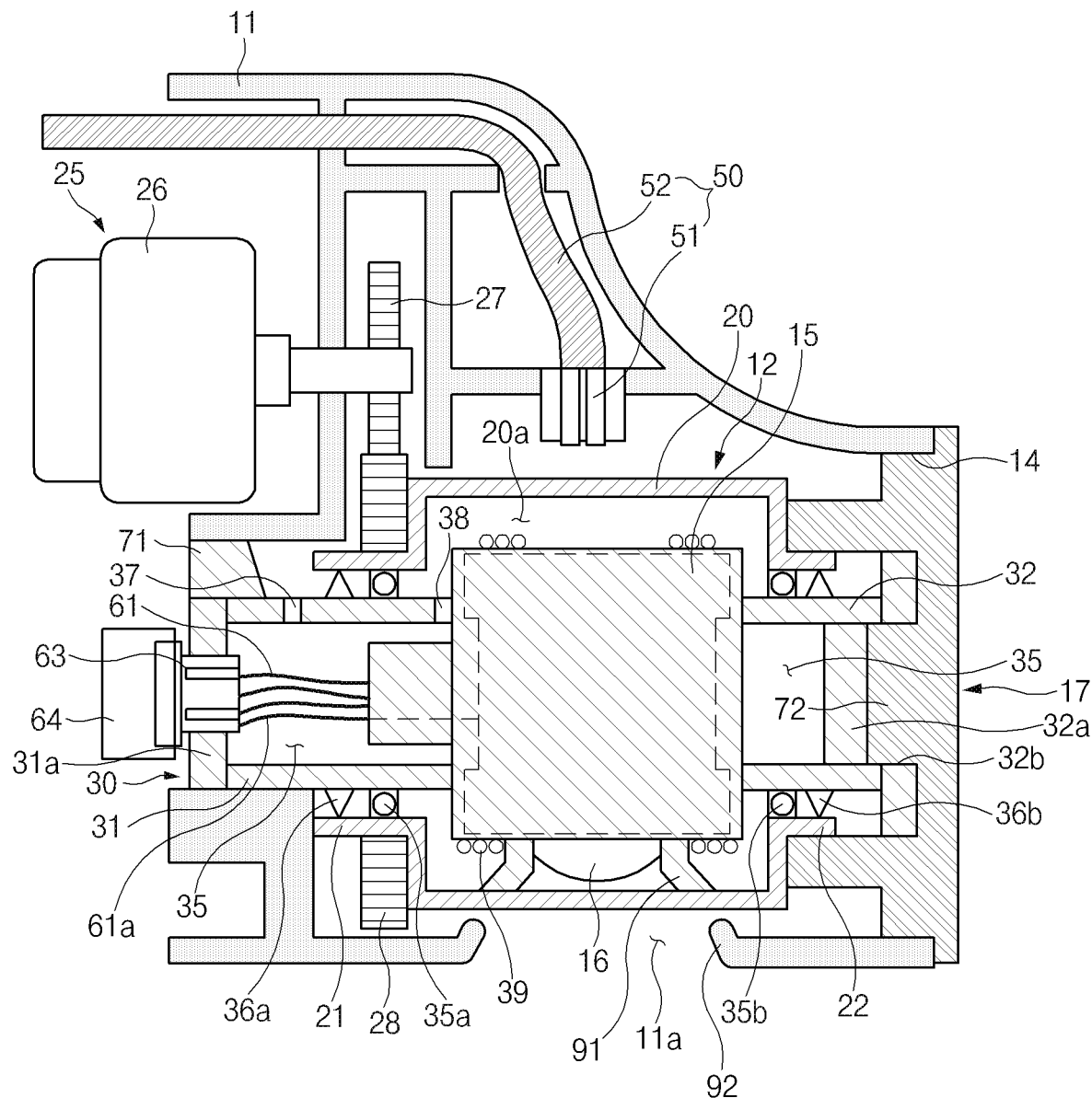
FIG. 4 illustrates a cross-sectional view of a sensing apparatus in one form of the present disclosure.

Referring to FIG. 4, the casing 11 may have a first opening 11a with which the lens 16 of the sensor module 15 is aligned, and a diameter of the first opening 11a may be larger than a diameter of the lens 16 of the sensor module 15. The casing 11 may have a second opening 14 allowing the assembly or disassembly of the sensor housing 20, the hollow shaft 30, and the wiper assembly 40, and a diameter of the second opening 14 may be larger than a diameter of the first opening 11a. The second opening 14 may be formed in one side of the casing 11. As a cover 17 is detachably coupled to the second opening 14, the second opening 14 may be opened or closed. The cover 17 may have a support projection 72 protruding toward the casing 11. The casing 11 may have a support block 71 attached to an internal frame thereof, and the support block 71 may protrude toward the hollow shaft 30.

Referring to FIG. 4, the sensor housing 20 may have a cavity 20a in which the sensor module 15 is received. The sensor housing 20 may be made of a transparent material allowing light to transmit therethrough, thereby reliably securing sensing performance of the sensor module 15.

The sensor housing 20 may have a first support portion and a second support portion 22, and the first support portion 21 and the second support portion 22 may have a smaller diameter than that of the sensor housing 20. The first support portion 21 and the second support portion 22 may be rotatably supported with respect to the hollow shaft 30 so that the sensor housing 20 may be rotatably mounted in the casing 11. The first support portion 21 may extend from one side of the sensor housing 20, and the first support portion 21 may pass through a driven gear 28. The second support portion 22 may extend from the other side of the sensor housing 20, and the second support portion 22 may face the first support portion 21. The first support portion 21 may be rotatably supported by a first bearing 35a, and the second support portion 22 may be rotatably supported by a second bearing 35b. A first sealing member 36a may abut the first bearing 35a, and a second sealing member 36b may abut the second bearing 35b so that the cavity 20a of the sensor housing 20 may be sealed.

The sensor housing 20 may be rotated by a driving unit 25. The driving unit 25 may include a driving motor 26, a driving gear 27 coupled to an output shaft of the driving motor 26, and the driven gear 28 meshing with the driving gear 27. The driven gear 28 may be fixed to the sensor housing 20. As the first support portion 21 of the sensor housing 20 is coupled to the driven gear 28 by passing therethrough, the driven gear 28 may be fixed to the sensor housing 20. The driving gear 27 may rotate around a first rotation axis X1, and the driven gear 28 and the sensor housing 20 may rotate around a second rotation axis X2. The first rotation axis X1 and the second rotation axis X2 may be parallel to a horizontal axis H of the vehicle. A rotational force of the driving motor 26 may be transmitted to the sensor housing 20 through the driving gear 27 and the driven gear 28 so that the sensor housing 20 may rotate in a clockwise direction or a counterclockwise direction. Since the sensor housing 20 does not require a high number of rotations, a gear ratio between the driving gear 27 and the driven gear 28 may be relatively low.

Referring to FIG. 4, the hollow shaft 30 may have a cavity 35 therein, and wires 61 for power supply and signal transmission/reception may be connected to the sensor module 15 through the cavity 35 of the hollow shaft 30. The hollow shaft 30 may include a first portion 31 and a second portion 32, and the first portion 31 and the second portion 32 may be attached to both opposing sides of the sensor module 15, respectively. The first portion 31 may be fixedly supported by the support block 71 of the casing 11, and a first closure wall 31a may be attached to an end of the first portion 31. The second portion may be fixedly supported by the cover 17, and a second closure wall 32a may be attached to an end of the second portion 32. The second closure wall 32a may be recessed from the end of the second portion 32 toward the sensor module 15. The second portion 32 may have a recess 32b defined by the second closure wall 32a and an interior surface of the second portion 32. As the support projection 72 of the cover 17 is inserted into the recess 32b of the second portion 32, the second portion 32 of the hollow shaft 30 may be fixedly supported by the cover 17. Thus, the hollow shaft 30 may be fixed to the casing 11 by the support block 71 and the support projection 72.

A connector 63 may be mounted on the first closure wall 31a of the first portion 31, and the wires 61 extending from the connector 63 may be connected to the sensor module 15. The hollow shaft 30 may pass through the cavity 20a of the sensor housing 20, and the sensor module 15 may be fixedly mounted to the hollow shaft 30. An axis of the sensor module 15 may be parallel to an axis of the hollow shaft 30 or may interest with the axis of the hollow shaft 30 at a predetermined angle. The sensor module 15 may be integrally connected to the hollow shaft 30 so that the sensor module 15, the sensor housing 20, and the hollow shaft 30 may form the sensor assembly 12.

The hollow shaft 30 may have a first air vent 37 communicating with the interior space of the casing 11, and a second air vent 38 communicating with the cavity 20a of the sensor housing 20. The first air vent 37 and the second air vent 38 may communicate with each other through the cavity 35 of the hollow shaft 30. The cavity 20a of the sensor housing 20 may communicate with the interior space of the casing 11 or the interior space of the vehicle through the first air vent 37 and the second air vent 38 of the hollow shaft 30, allowing the sensor housing 20 to secure air ventilation, and thus the occurrence of fog/frost on or freezing of the sensor housing 20 and/or the lens 16 of the sensor module 15 may be prevented.

The sensing apparatus 10 in some forms of the present disclosure may further include a heating wire 39 for removing fog or frost from the sensor housing 20 and/or the lens 16, and the heating wire 39 may be mounted on at least one of the hollow shaft 30 and the sensor module 15.

In some forms of the present disclosure, as illustrated in FIG. 4, a power supply wire 61a may be connected to the heating wire 39 through the cavity 35 of the hollow shaft 30. In particular, the heating wire 39 may be disposed around the lens 16 of the sensor module 15 so that the fog or frost may be quickly removed by radiant heat of the heating wire 39.

Figure 5:
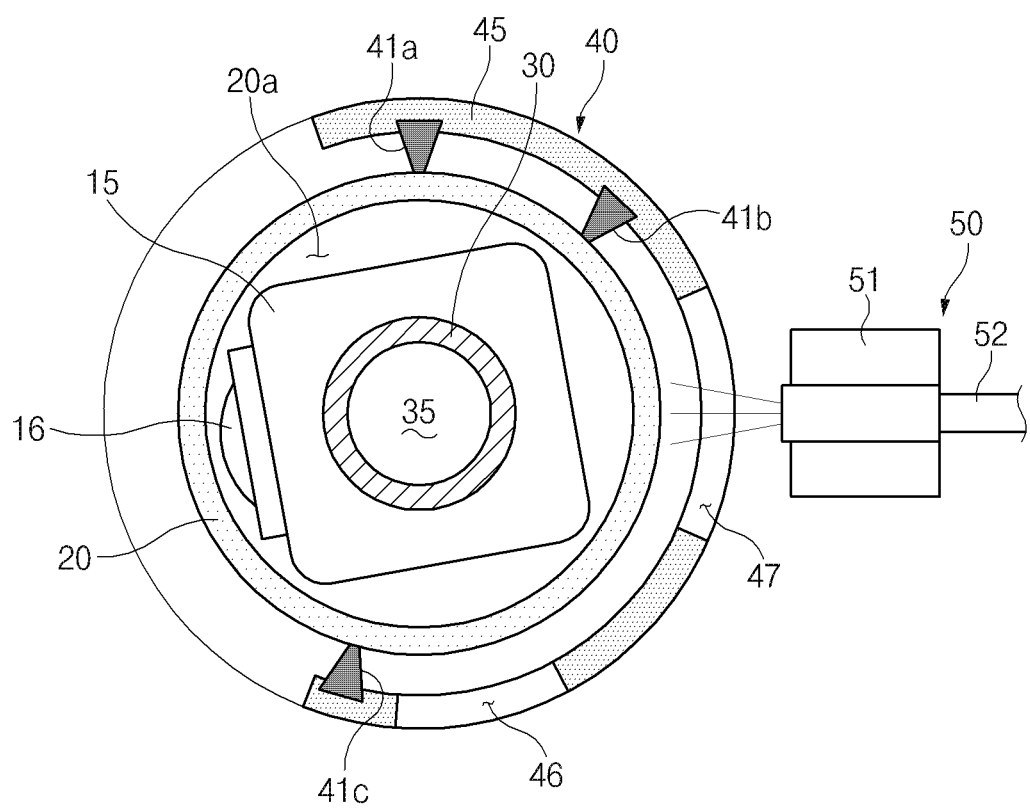
FIG. 5 illustrates a sensor housing, a wiper assembly, and a spray mechanism of a sensing apparatus in one form of the present disclosure.

Referring to FIGS. 4 and 5, the sensing apparatus 10 in some forms of the present disclosure may include a spray mechanism 50 spraying a cleaning fluid such as a washer fluid or air onto the surface of the sensor housing 20. The spray mechanism 50 may have a nozzle 51 spraying the cleaning fluid such as the washer fluid or air, and a hose 52 connected to the nozzle 51. The nozzle 51 may be spaced apart from the surface of the sensor housing 20 and the wiper assembly 40 by a predetermined gap, and the hose 52 may allow the cleaning fluid such as the washer fluid or air to flow into the nozzle 51. The nozzle 51 may spray the cleaning fluid at a predetermined pressure, and the wiper 41 of the wiper assembly 40 may wipe the surface of the sensor housing 20 so that the viscous foreign material attached to the surface of the sensor housing 20 may be effectively removed.

Referring to FIG. 5, the wiper assembly 40 may include one or more wipers 41a, 41b, and 41c, and a wiper frame 45 on which the wipers 41a, 41b, and 41c are mounted. The wiper frame 45 may have a drain slot 46 through which the foreign material removed from the surface of the sensor housing 20 by the wipers 41a, 41b, and 41c is discharged. The wiper frame 45 may have an opening 47 through which the cleaning fluid sprayed from the nozzle 51 passes.

FIGS. 6 to 11 illustrate examples of various arrangements of the wipers 41a, 41b, and 41c according to the rotation direction of the sensor housing 20.

Figure 6:
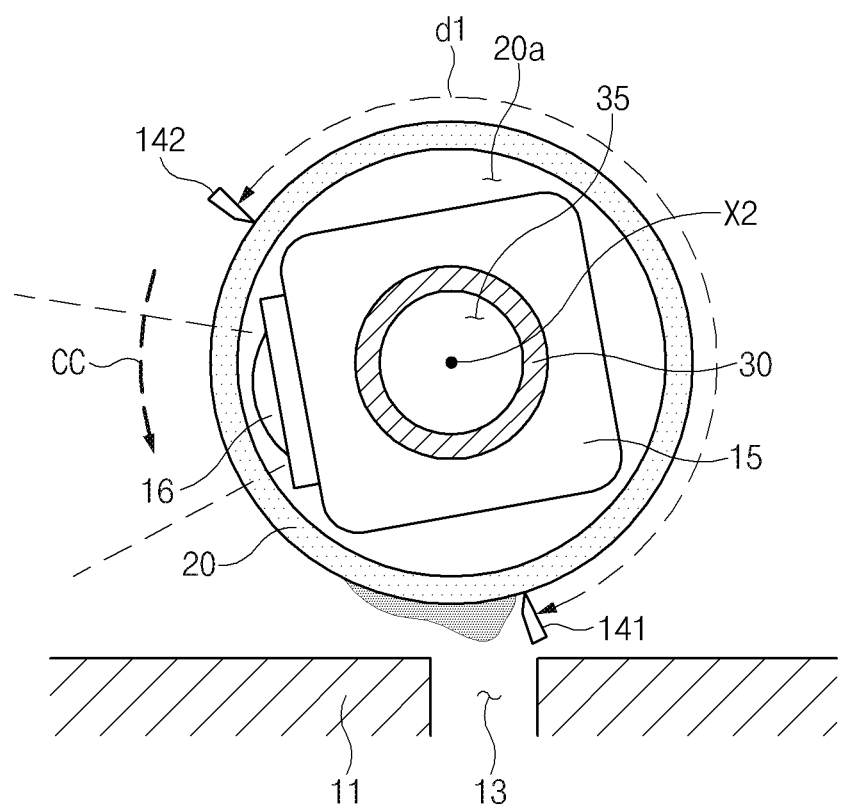
FIG. 6 illustrates the arrangement of a plurality of wipers in a wiper assembly of a sensing apparatus in one form of the present disclosure.

FIG. 6 illustrates a structure in which the sensor housing 20 rotates in a counterclockwise direction CC around the second rotation axis X2. A first wiper 141 may be disposed adjacent to the drain hole 13 of the casing 11. As the sensor housing 20 rotates in the counterclockwise direction CC, the foreign material attached to the surface of the sensor housing 20 may be removed by the first wiper 141 and be discharged through the drain hole 13. When the sensor housing 20 rotates in the counterclockwise direction CC, a distance between the first wiper 141 and the lens 16 of the sensor module 15 may be relatively increased in a state in which the first wiper 141 removes the foreign material, which may increase the possibility of condensation or moisture formation. In order to clear condensation or moisture, a second wiper 142 may be additionally disposed adjacent to the lens 16 of the sensor module 15. The second wiper 142 may be spaced apart from the first wiper 141 by a predetermined arc distance d1. The arc distance d1 between the first wiper 141 and the second wiper 142 may be similar to or the same as the distance between the first wiper 141 and the lens 16 of the sensor module 15.

Figure 7:
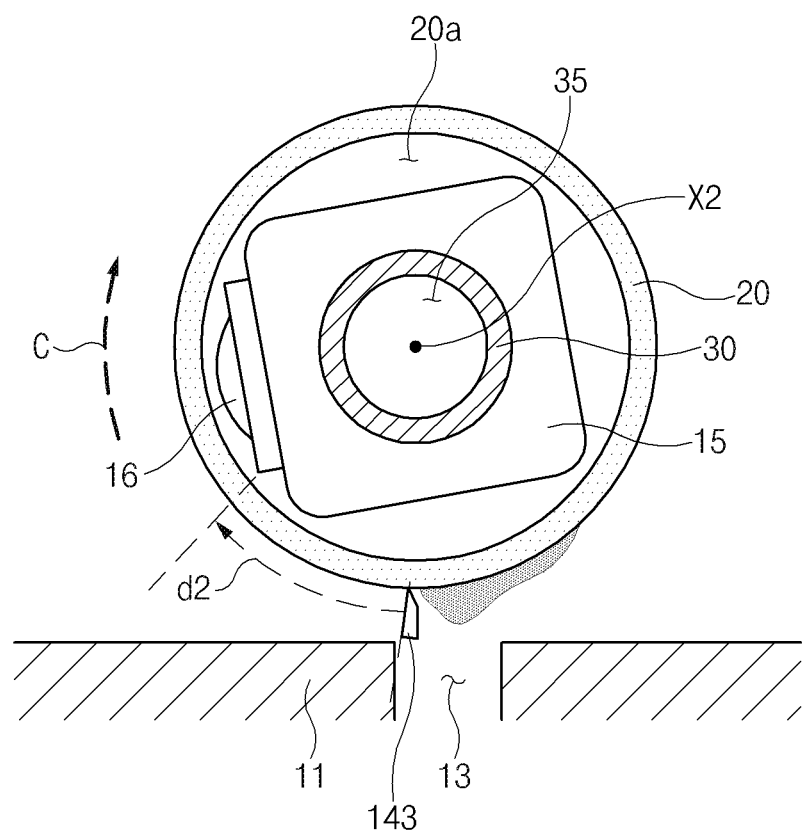
FIG. 7 illustrates the arrangement of a wiper in a wiper assembly of a sensing apparatus in one form of the present disclosure.

FIG. 7 illustrates a structure in which the sensor housing 20 rotates in a clockwise direction C. A wiper 143 may be disposed adjacent to the drain hole 13 of the casing 11. As the sensor housing 20 rotates in the clockwise direction C, the foreign material attached to the surface of the sensor housing 20 may be removed by the wiper 143 and be discharged through the drain hole 13. When the sensor housing 20 rotates in the clockwise direction C, a distance d2 between the wiper 143 and the lens 16 of the sensor module 15 may be relatively reduced in a state in which the wiper 143 removes the foreign material, which may reduce the possibility of condensation or moisture formation. Thus, there is no need to provide an additional wiper for clearing condensation or moisture.

Figure 8:
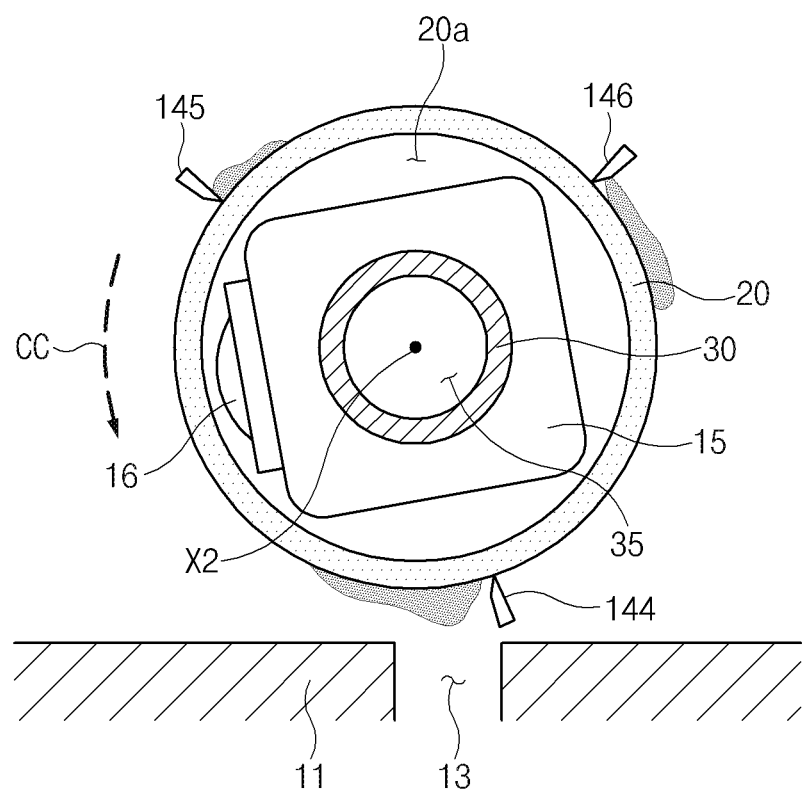
FIG. 8 illustrates the arrangement of a plurality of wipers in a wiper assembly of a sensing apparatus in one form of the present disclosure.

FIG. 8 illustrates a structure in which the sensor housing 20 rotates in the counterclockwise direction CC. Three wipers 144, 145, and 146 may be spaced apart from each other along the circumference of the sensor housing 20. A first wiper 144 may be disposed adjacent to the drain hole 13 of the casing 11, a second wiper 145 may be disposed adjacent to the lens 16 of the sensor module 15, and a third wiper 146 may be disposed between the first wiper 144 and the second wiper 145. In particular, the third wiper 146 may be placed in a position in which the foreign material is easily removed due to the curved surface, gravity, and the like of the sensor housing 20. As the sensor housing 20 rotates in the counterclockwise direction CC, the first wiper 144 may primarily remove the foreign material, the third wiper 146 may secondarily remove the foreign material, and the second wiper 145 may finally remove the foreign material and clear condensation or moisture.

Figure 9:
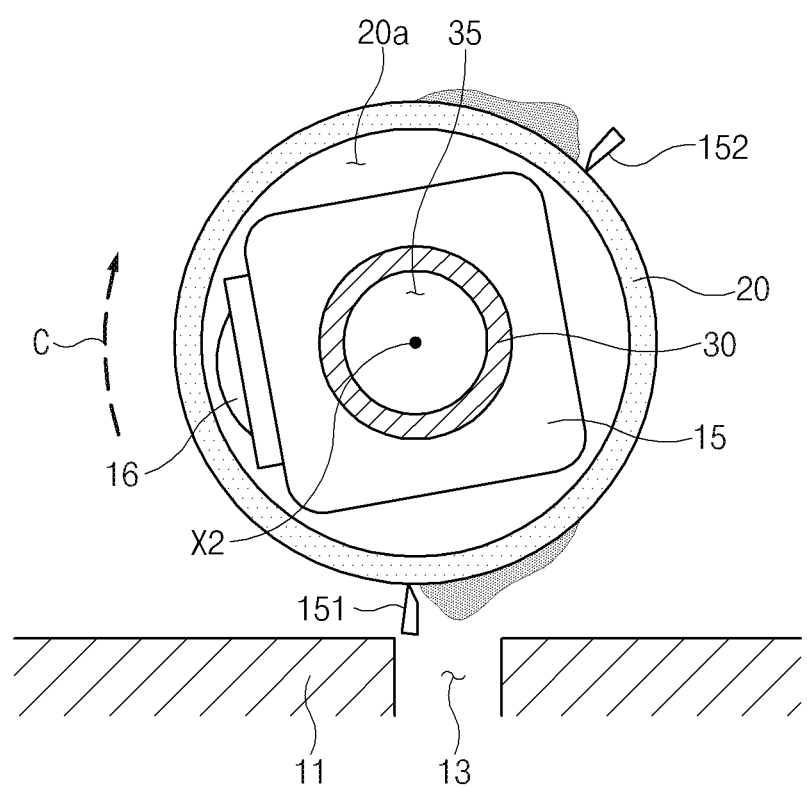
FIG. 9 illustrates the arrangement of a plurality of wipers in a wiper assembly of a sensing apparatus in one form of the present disclosure.

FIG. 9 illustrates a structure in which the sensor housing 20 rotates in the clockwise direction C. Two wipers 151 and 152 may be spaced apart from each other along the circumference of the sensor housing 20. A first wiper 151 may be disposed adjacent to the drain hole 13 of the casing 11, and a second wiper 152 may be placed in a position in which the foreign material is easily removed due to the curved surface, gravity, and the like of the sensor housing 20. As the sensor housing 20 rotates in the clockwise direction C, the first wiper 151 may primarily remove the foreign material, and the second wiper 152 may finally remove the foreign material and clear condensation or moisture.

In some forms of FIGS. FIGS. 8 and 9, the plurality of wipers 144, 145, 146, 151, and 152 may be arranged to effectively remove the foreign material.

Figure 10:
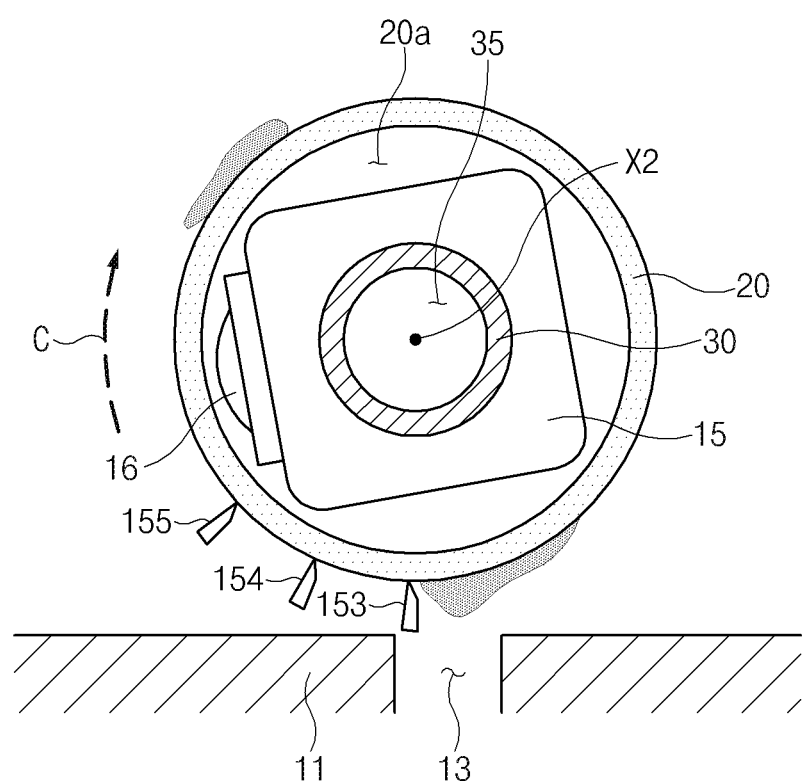
FIG. 10 illustrates the arrangement of a plurality of wipers in a wiper assembly of a sensing apparatus in one form of the present disclosure.

FIG. 10 illustrates a structure in which the sensor housing 20 rotates in the clockwise direction C. Three wipers 153, 154, and 155 may be intensively disposed adjacent to the drain hole 13 of the casing 11. A first wiper 153 may be closest to the drain hole 13 of the casing 11, a second wiper 154 may be spaced apart from the first wiper 153, and a third wiper 155 may be spaced apart from the second wiper 154. The first wiper 153, the second wiper 154, and the third wiper 155 may be arranged in the rotation direction of the sensor housing 20 so that the first wiper 153, the second wiper 154, and the third wiper 155 may sequentially remove the foreign material attached to the surface of the sensor housing 20.

Figure 11:
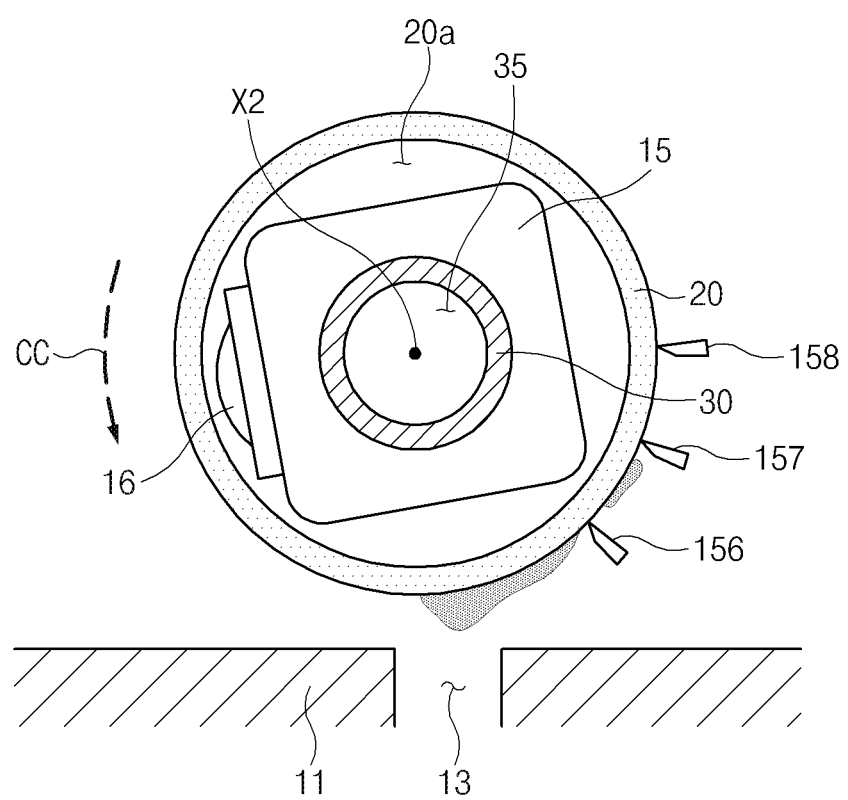
FIG. 11 illustrates the arrangement of a plurality of wipers in a wiper assembly of a sensing apparatus in one form of the present disclosure.

FIG. 11 illustrates a structure in which the sensor housing 20 rotates in the counterclockwise direction CC. Three wipers 156, 157, and 158 may be intensively disposed adjacent to the drain hole 13 of the casing 11. A first wiper 156 may be closest to the drain hole 13 of the casing 11, a second wiper 157 may be spaced apart from the first wiper 156, and a third wiper 158 may be spaced apart from the second wiper 157. The first wiper 156, the second wiper 157, and the third wiper 158 may be arranged in the rotation direction of the sensor housing 20 so that the first wiper 156, the second wiper 157, and the third wiper 158 may sequentially remove the foreign material attached to the surface of the sensor housing 20.

In some forms of disclosure, FIGS. 10 and 11, the plurality of wipers 153, 154, 155, 156, 157, and 158 may be intensively disposed adjacent to the drain hole 13 of the casing 11 so that the volume of the wiper assembly 40 may be reduced.

Figure 12:
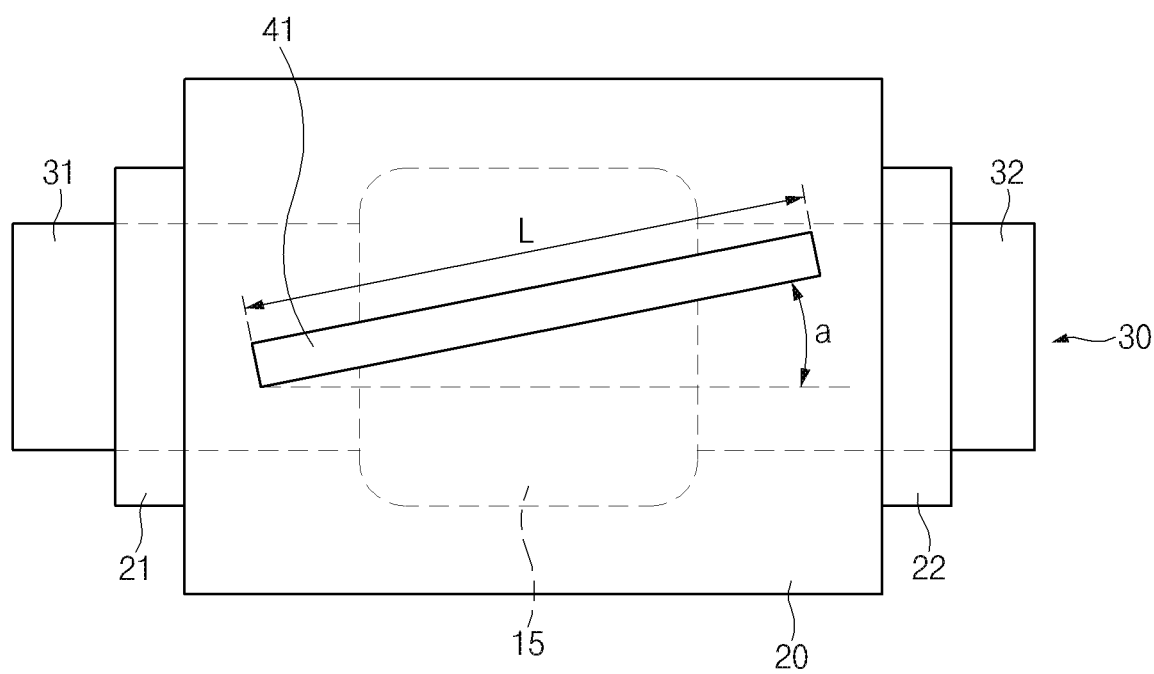
FIG. 12 illustrates the tilting of an axis of a wiper with respect to an axis of a sensor housing in a sensing apparatus in one form of the present disclosure.

Referring to FIG. 12, an longitudinal axis of the wiper 41 may be tilted with respect to the longitudinal axis of the sensor housing 20 at a predetermined tilting angle a. Thus, the removed foreign material may easily flow down into the drain hole 13 of the casing 11. Here, the tilting angle of the wiper 41 may be designed by taking durability of the wiper 41 and RPM of the sensor housing 20 into consideration. In addition, a length L of the wiper 41 may be set to correspond to a width of the lens 16 of the sensor module 15 or the viewing angle of the sensor module 15. When the length L of the wiper 41 is excessively greater than the viewing angle of the sensor module 15, the foreign material may flow down toward the lens 16 of the sensor module 15 due to a resultant force created during the rotation of the sensor housing 20 and a lateral acceleration created in the sensor housing 20, thereby blocking the view of the sensor module 15.

Figure 13:
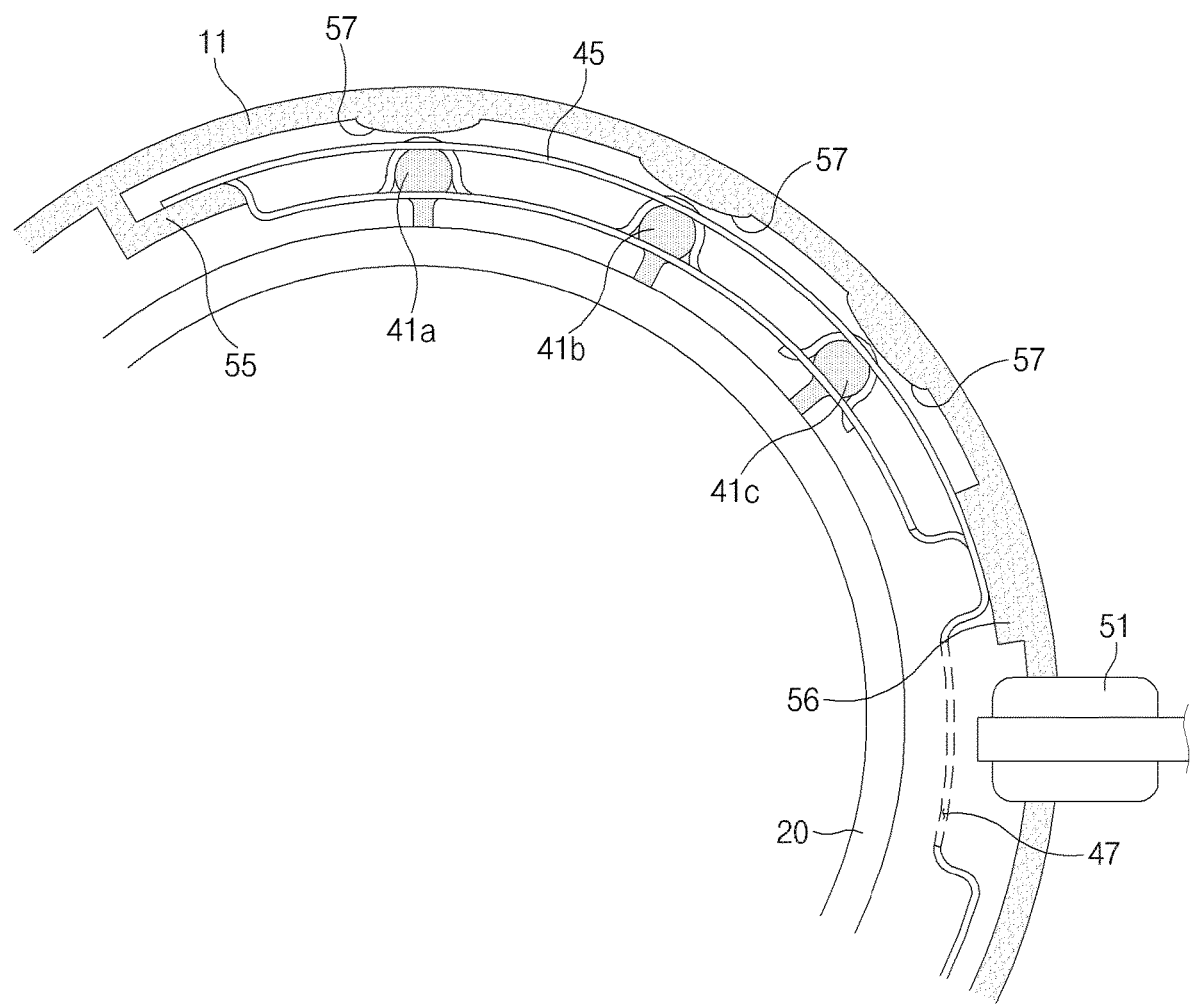
FIG. 13 illustrates a wiper assembly, a spray mechanism, and a sensor housing of a sensing apparatus in one form of the present disclosure.

Referring to FIG. 13, the wiper assembly 40 may include the wiper frame 45 on which the plurality of wipers 41a, 41b, and 41c are mounted. The wiper frame 45 may extend in a circumferential direction of the sensor housing 20, and the wiper frame 45 may be spaced apart from an exterior surface of the sensor housing 20 in a radial direction. The wiper frame 45 may be coupled to a mounting flange 55 and a mounting boss 56 protruding from the casing 11. The casing 11 may have a plurality of pressing projections 57 protruding toward the sensor housing 20, and the pressing projections 57 may press the wipers 41a, 41b, and 41c toward the sensor housing 20, respectively. Each of the wipers 41a, 41b, and 41c may come in close contact with the surface of the sensor housing 20, thereby effectively removing the foreign material attached to the surface of the sensor housing 20.

Figure 14:
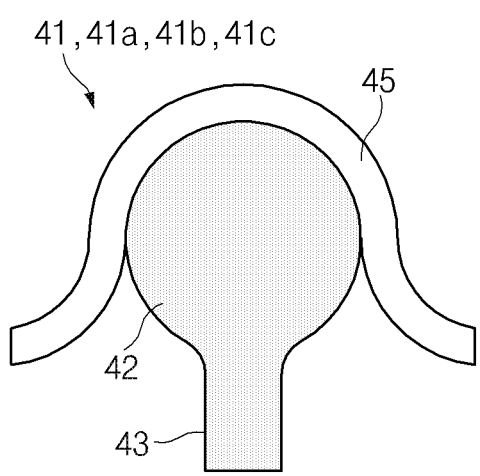
FIG. 14 illustrates a cross-sectional view of a wiper in a wiper assembly of a sensing apparatus in one form of the present disclosure.

Referring to FIG. 14, each of the wipers 41, 41a, 41b, and 41c may include a mounting portion 42 mounted on the wiper frame 45, and a lip portion 43 extending from the mounting portion 42. The mounting portion 42 may have a circular cross section, and the lip portion 43 may extend from the mounting portion 42. As the mounting portion 42 has a circular cross section, the lip portion 43 may be firmly connected to the mounting portion 42, and the foreign material on a double curved surface may be continuously removed.

Figure 15:
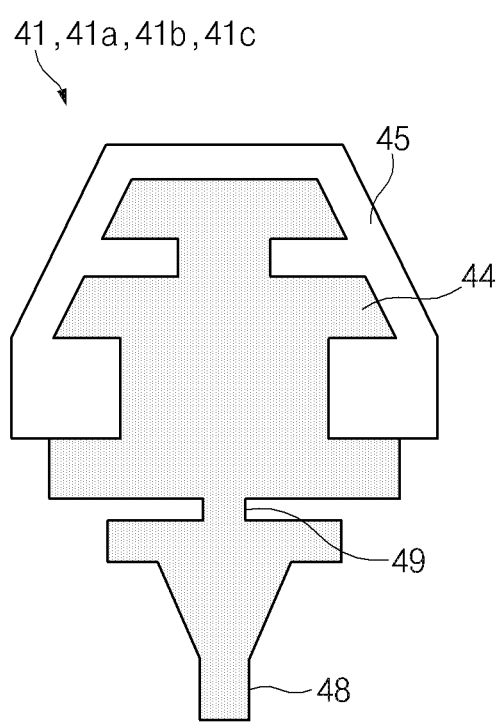
FIG. 15 illustrates a cross-sectional view of a wiper in a wiper assembly of a sensing apparatus in one form of the present disclosure.

Referring to FIG. 15, each of the wipers 41, 41a, 41b, and 41c may include a mounting portion 44 mounted on the wiper frame 45, a lip portion 48 extending from the mounting portion 44, and a connecting portion 49 located between the mounting portion 44 and the lip portion 48. A width of the connecting portion 49 may be less than a width of the lip portion 48, and the lip portion 48 may be flexibly bent through the connecting portion 49. In some forms of FIG. 15, the wiper may be easy to rapidly change its direction, and effectively remove the foreign material on the double curved surface.

Figure 16:
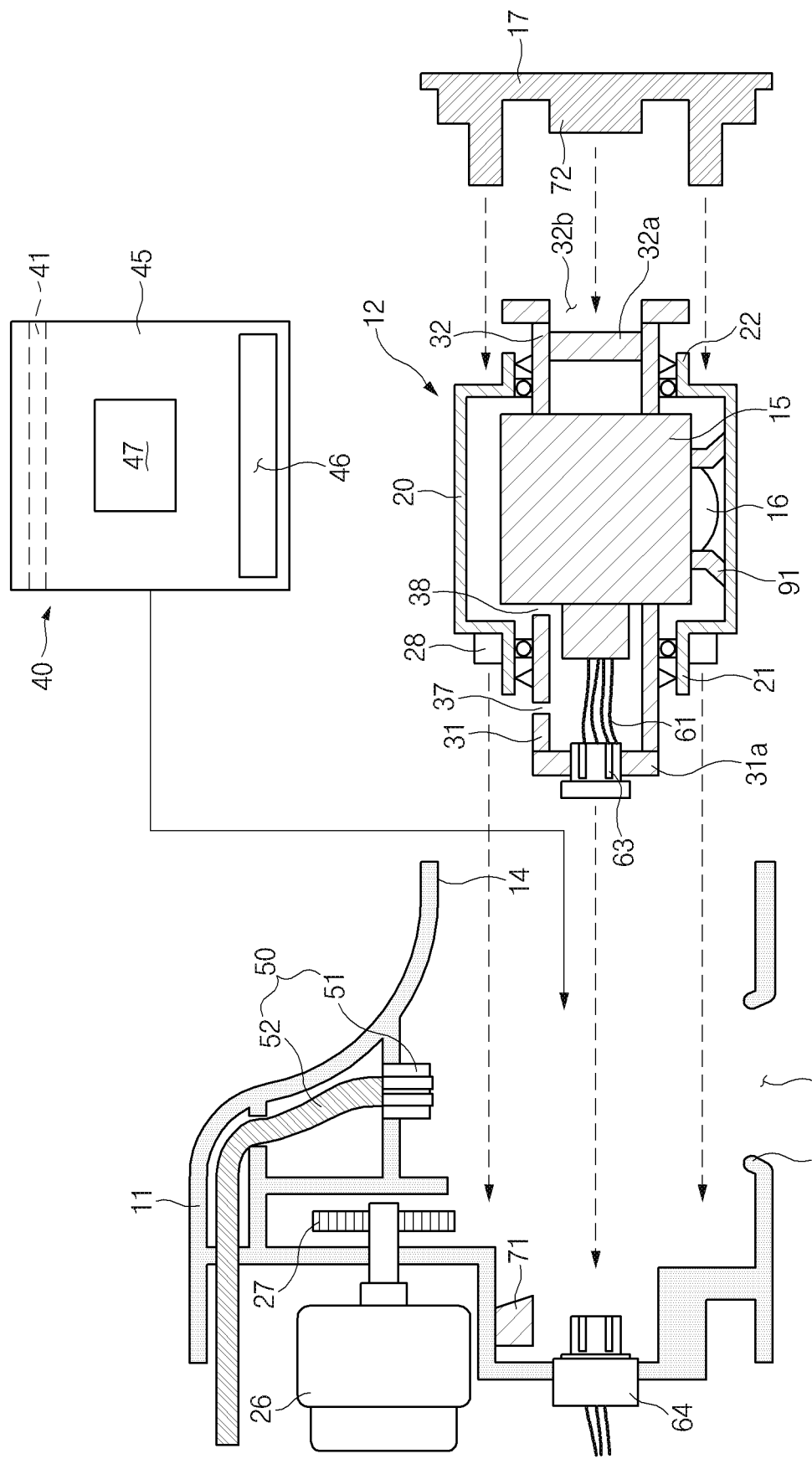
FIG. 16 illustrates the separation of a sensor assembly and a wiper assembly from a casing in a sensing apparatus in one form of the present disclosure.

Referring to FIG. 16, when the cover 17 is separated from the second opening 14 of the casing 11, the hollow shaft and the sensor housing 20 may be separated through the second opening 14 of the casing 11, and the wiper assembly 40 mounted on the interior surface of the casing 11 may be separated. Thus, maintenance of the sensor module 15 and replacement of the wiper assembly 40 may be performed.

Figure 17:
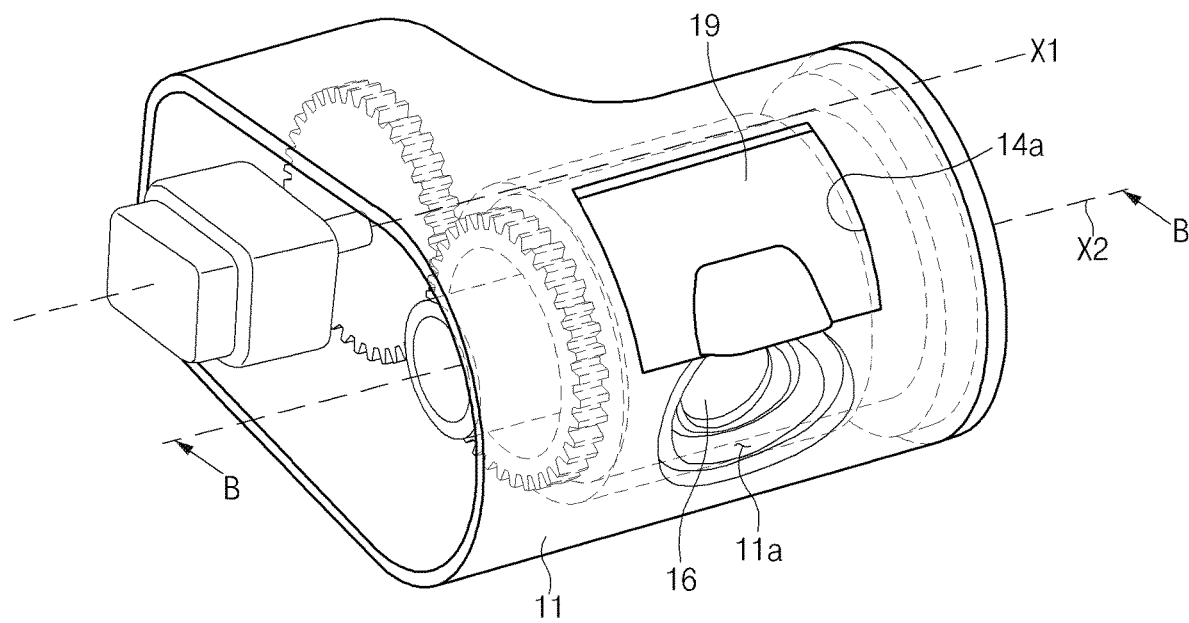
FIG. 17 illustrates a perspective view of a sensing apparatus in one form of the present disclosure.

In some forms of FIG. 17, the casing 11 may have a second opening 14a which is opened and closed by a pivotal swing cover 19, and the second opening 14a may be located in a front or top surface of the casing 11. The second opening 14a may be adjacent to the first opening 11a of the casing 11, and the swing cover 19 may open and close the second opening 14a. FIG. 17 illustrates the swing cover 19 having a relatively small size so as to allow only the replacement of the wiper assembly 40.

Figure 18:
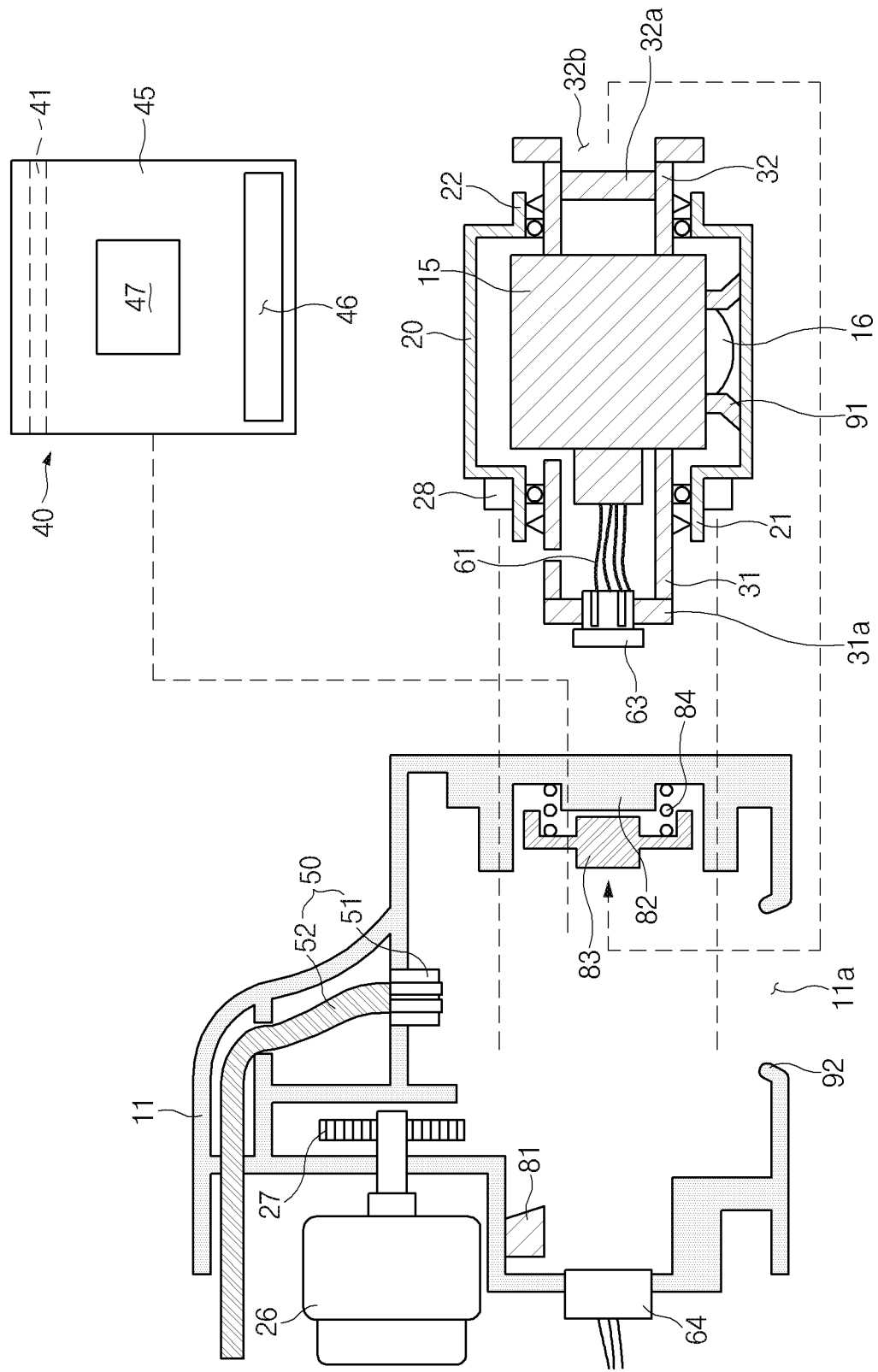
FIG. 18 illustrates a cross-sectional view of a sensing apparatus in one form of the present disclosure, taken along line B-B of FIG. 17, in a state in which a sensor assembly and a wiper assembly are separated from a casing.
Figure 19:
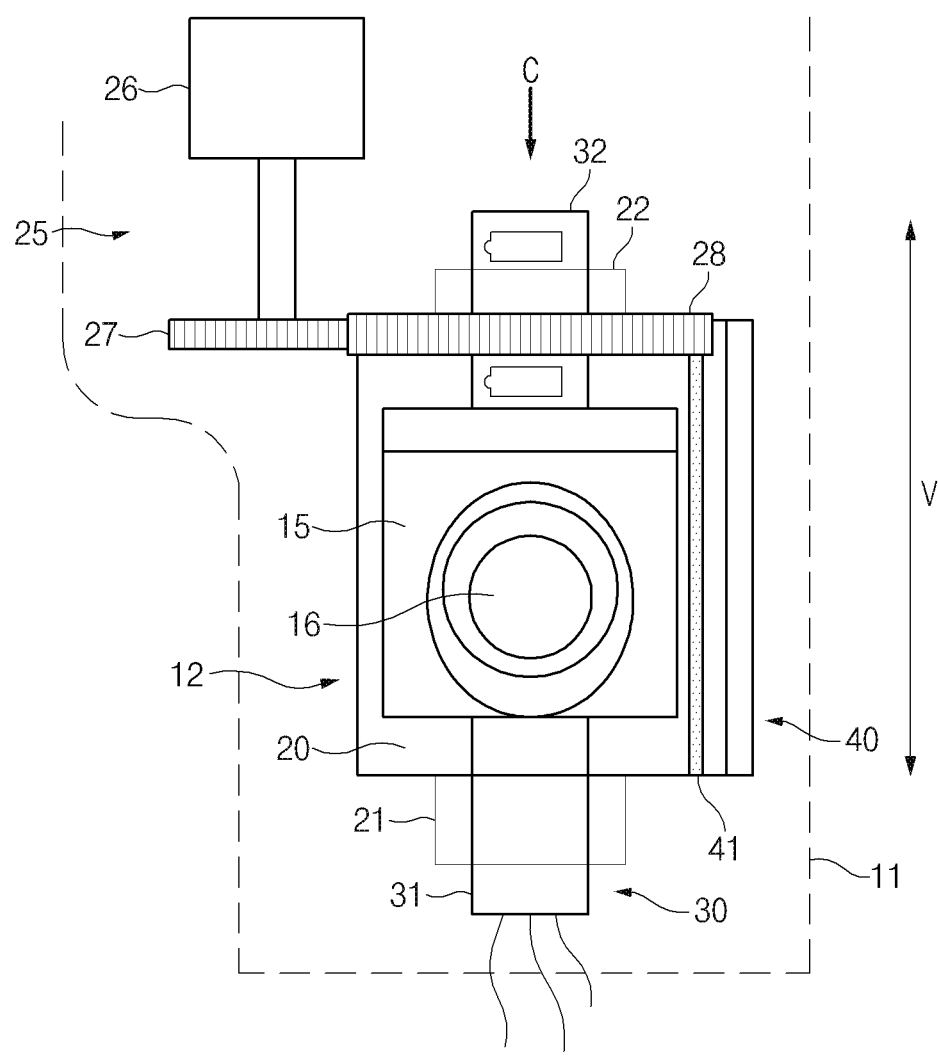
FIG. 19 illustrates a sensing apparatus in one form of the present disclosure.
Figure 20:
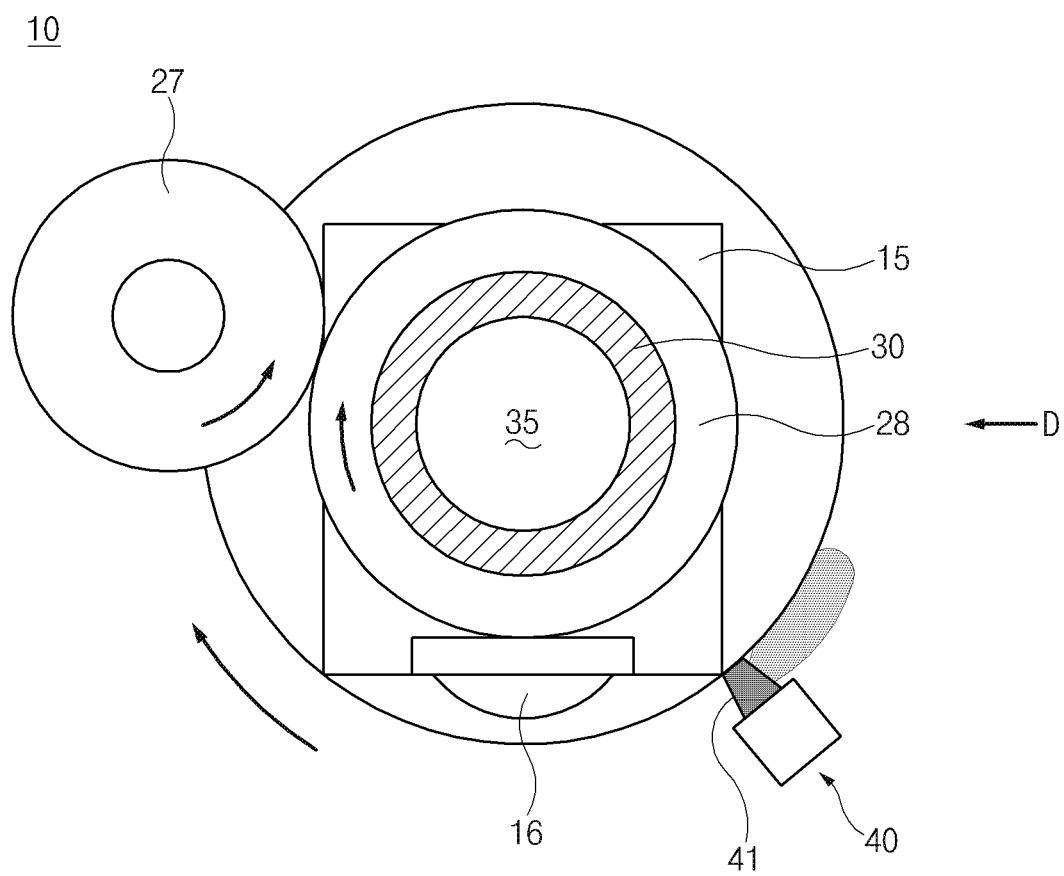
FIG. 20 illustrates a view which is viewed from a direction indicated by arrow C of FIG. 19.

When the swing cover 19 and the second opening 14a are relatively large, the sensor assembly 12, the driving unit 25, and the wiper assembly 40 may be replaced as a whole. FIG. 18 illustrates the swing cover 19 and the second opening 14a having a relatively large size so as to allow the replacement of all components including the sensor assembly 12, the driving unit 25, and the wiper assembly 40 received in the casing 11. Referring to FIG. 18, the casing 11 may have a first support block 81 supporting the first portion 31 of the hollow shaft 30, and a second support block 82 supporting the second portion 32 of the hollow shaft 30. The first support block 81 may protrude toward an exterior surface of the first portion 31. The first support block 81 may contact at least a portion of the exterior surface of the first portion 31, thereby supporting the first portion 31. The second support block 82 may protrude toward the second portion 32 of the hollow shaft 30, and a fitting member and an elastic member 84 may be mounted on the second support block 82. The fitting member 83 may fit in a recess 32b of the second portion 32 of the hollow shaft 30, and the elastic member 84 may elastically support the fitting member 83. As the swing cover 19 swings outwards with respect to the casing 11, and the second opening 14a is opened, the hollow shaft 30 and the sensor housing 20 may be primarily separated through the second opening 14 of the casing 11, and then the wiper assembly 40 mounted on the interior surface of the casing 11 may be secondarily separated. Thus, replacement and repair of the sensor assembly 12, replacement and repair of the driving unit 25, replacement of the wiper assembly 40, and the like may be easily performed.

In some forms of FIGS. 1 to 18, a longitudinal axis of the casing 11 may extend along the horizontal axis H of the vehicle, and the casing 11 may be aligned with the horizontal axis H of the vehicle. That is, the sensing apparatus 10 in some forms of FIGS. 1 to 18 may be aligned with the horizontal axis H of the vehicle, and the first rotation axis X1 and the second rotation axis X2 may be parallel to the horizontal axis H of the vehicle.

Figure 22:
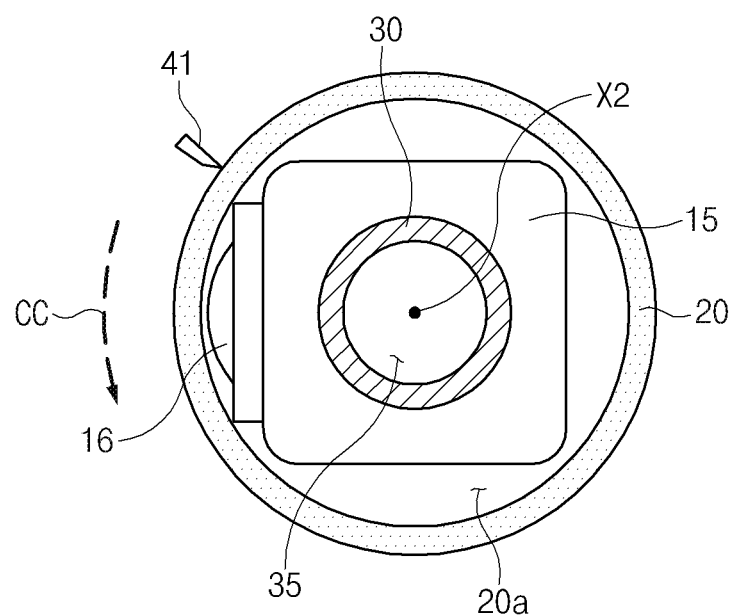
FIG. 22 illustrates the arrangement of a wiper in a wiper assembly of a sensing apparatus in one form of the present disclosure.
Figure 23:
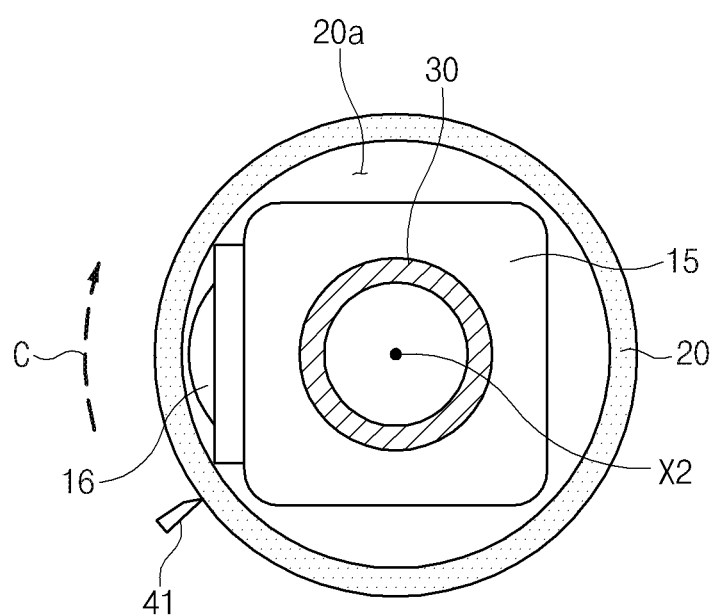
FIG. 23 illustrates the arrangement of a wiper in a wiper assembly of a sensing apparatus in one form of the present disclosure.
Figure 24:
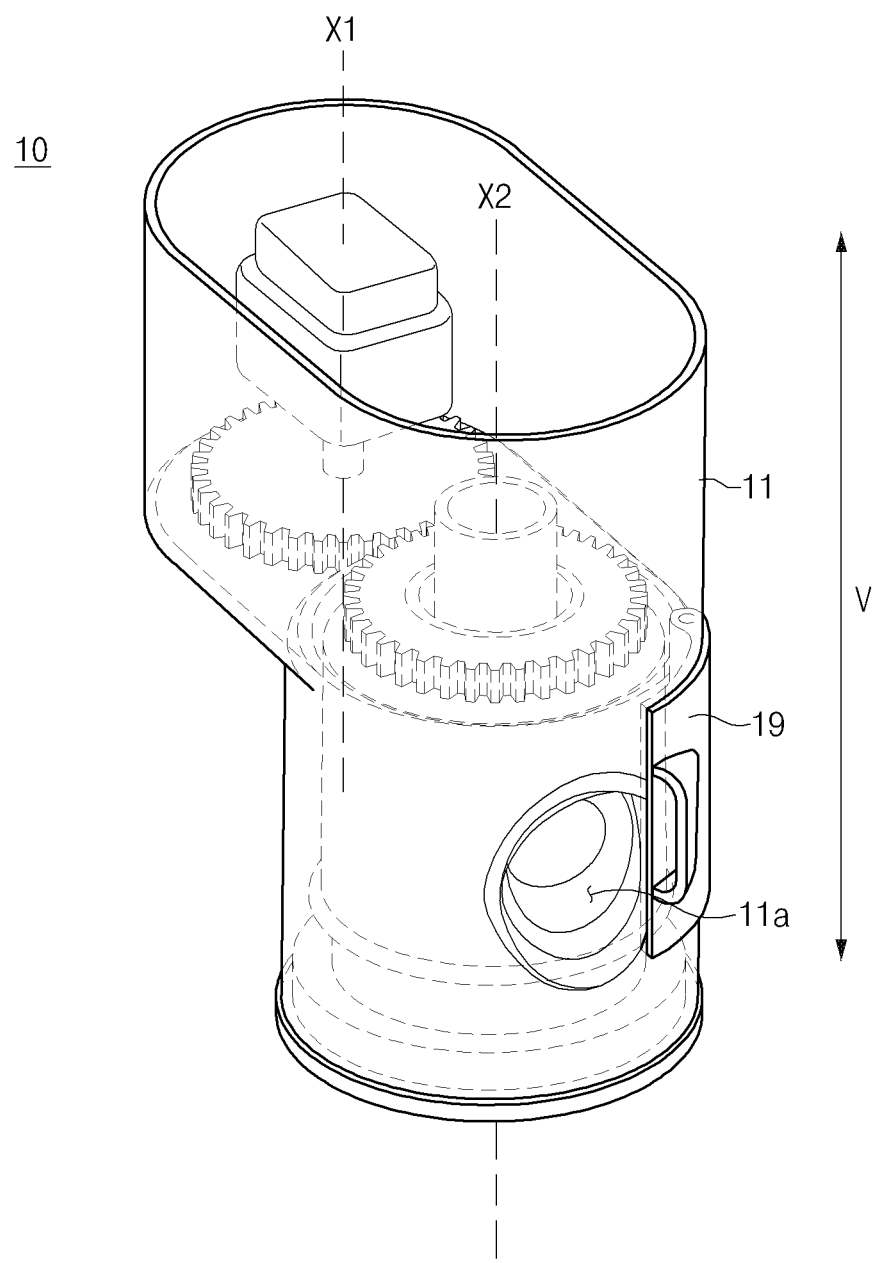
FIG. 24 illustrates a perspective view of a sensing apparatus in one form of the present disclosure.

Referring to FIGS. 19 to 24, the sensing apparatus 10 may be aligned with a vertical axis V of the vehicle. Referring to FIG. 24, the longitudinal axis of the casing 11, the first rotation axis X1 and the second rotation axis X2 may be parallel to the vertical axis V of the vehicle.

Figure 21:
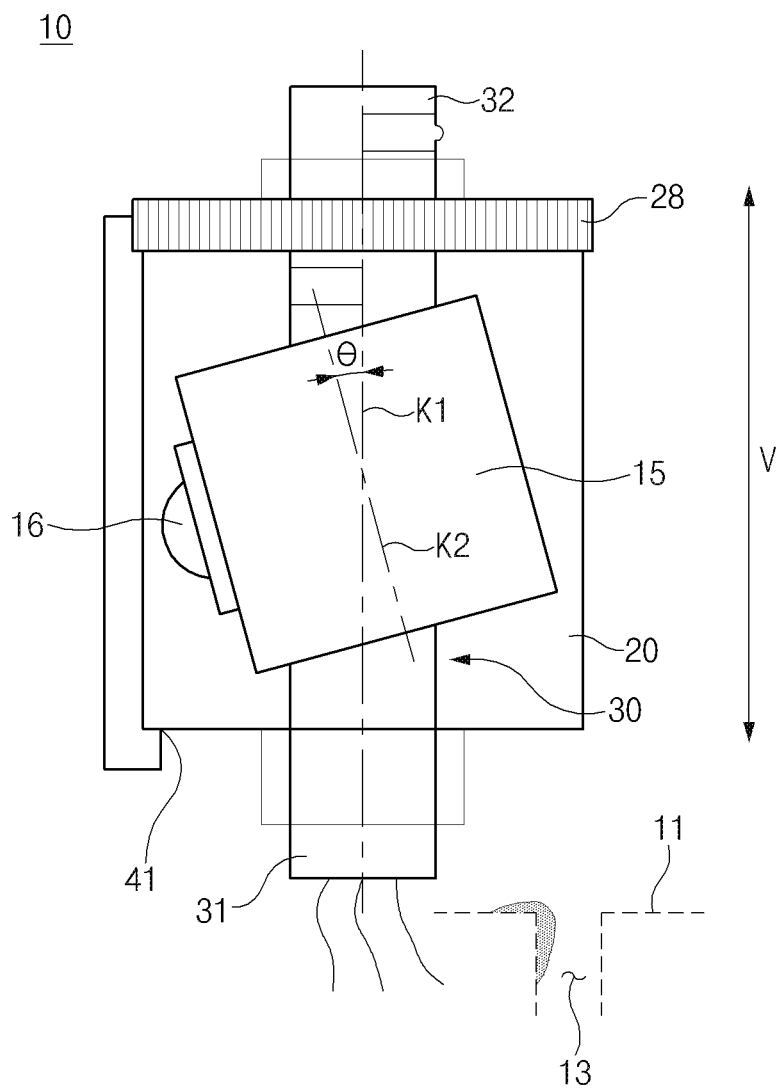
FIG. 21 illustrates a view which is viewed from a direction indicated by arrow D of FIG. 20.

When the sensing apparatus 10 is aligned with the vertical axis V of the vehicle, an axis K2 of the sensor module 15 may be inclined or intersect with an axis K1 of the hollow shaft 30 at a predetermined angle θ as illustrated in FIG. 21. Thus, the field of view of the lens 16 of the sensor module 15 may be easily secured.

Referring to FIG. 21, the drain hole 13 may be located in the bottom of the casing 11, so that the foreign material removed by the wiper 41 may be easily discharged through the drain hole 13.

FIG. 22 illustrates a structure in which the sensor housing 20 rotates in the counterclockwise direction CC around the second rotation axis X2 parallel to the vertical axis V of the vehicle. The wiper 41 may be adjacent to the lens 16 of the sensor module 15. As the sensor housing 20 rotates in the counterclockwise direction CC, the foreign material attached to the surface of the sensor housing 20 may be removed by the wiper 41, and the foreign material may be easily discharged through the drain hole 13 (see FIG. 21) located in the bottom of the sensor housing 20 due to its own weight. Since a distance between the wiper 41 and the lens 16 of the sensor module 15 is relatively short, the possibility of condensation or moisture formation may be low.

FIG. 23 illustrates a structure in which the sensor housing 20 rotates in the clockwise direction C around the second rotation axis X2 parallel to the vertical axis V of the vehicle. The wiper 41 may be adjacent to the lens 16 of the sensor module 15. As the sensor housing 20 rotates in the clockwise direction C, the foreign material attached to the surface of the sensor housing 20 may be removed by the wiper 41, and the foreign material may be easily discharged through the drain hole 13 (see FIG. 21) located in the bottom of the sensor housing 20 due to its own weight. Since a distance between the wiper 41 and the lens 16 of the sensor module 15 is relatively short, the possibility of condensation or moisture formation may be low.

In the vertical-type sensing apparatus 10 which is aligned with the vertical axis V of the vehicle, the drain hole 13 may be formed in the bottom of the casing 11, and thus the discharge of the foreign material may not be affected by the rotation direction of the sensor housing 20.

In some forms of FIG. 24, the casing 11 may have the second opening which is opened and closed by the pivotal swing cover 19. The swing cover 19 may be located on a lateral wall of the casing 11, and the second opening 14a may be adjacent to the first opening 11a of the casing 11. In particular, the swing cover 19 of FIG. 24 may have a relatively small size so as to allow only the replacement of the wiper assembly 40.

When the swing cover 19 and the second opening are relatively large, the sensor assembly 12, the driving unit 25, and the wiper assembly 40 may be replaced as a whole.

The sensing apparatus 10 in some forms of the present disclosure may further include glare shutters 91 and 92 preventing glare or flare. As the sensor housing 20 is formed as a cylinder having a predetermined radius, the curvature of the sensor housing 20 may result in the occurrence of glare or flare phenomenon such as an undesirable artifact or a haze across the image. For example, when light from an external light source, such as a rear light of a vehicle ahead or a headlight of a vehicle traveling on the opposite lane, is transmitted to the lens 16 of the sensor module 15, light spreading, image distortion, scattered reflection, and the like may occur, which may increase misrecognition of the sensor module 15. In order to solve these problems, the glare shutters 91 and 92 may be disposed around the circumference of the lens 16 of the sensor module 15, and the glare shutters 91 and 92 may block the light transmitted from the external light source to the lens 16 of the sensor module 15. In particular, the glare shutters 91 and 92 may be inclined walls which are inclined from the circumference of the lens 16 toward the outside of the casing 11, and an inclination angle range of the inclined walls may be determined so as not to interfere with the viewing angle of the lens 16 of the sensor module 15.

Referring to FIGS. 4, 25, 26, and 27, the glare shutters 91 and 92 may include an internal shutter 91 located inside the sensor housing 20, and an external shutter 92 located outside the sensor housing 20. The internal shutter 91 may be attached to the circumference of the lens 16 of the sensor module 15, and the external shutter 92 may be attached to the circumference of the first opening 11a of the casing 11.

The internal shutter 91 and the external shutter 92 may be separated by the sensor housing 20. The internal shutter 91 and the external shutter 92 may be the walls inclined at a predetermined angle.

Figure 25:
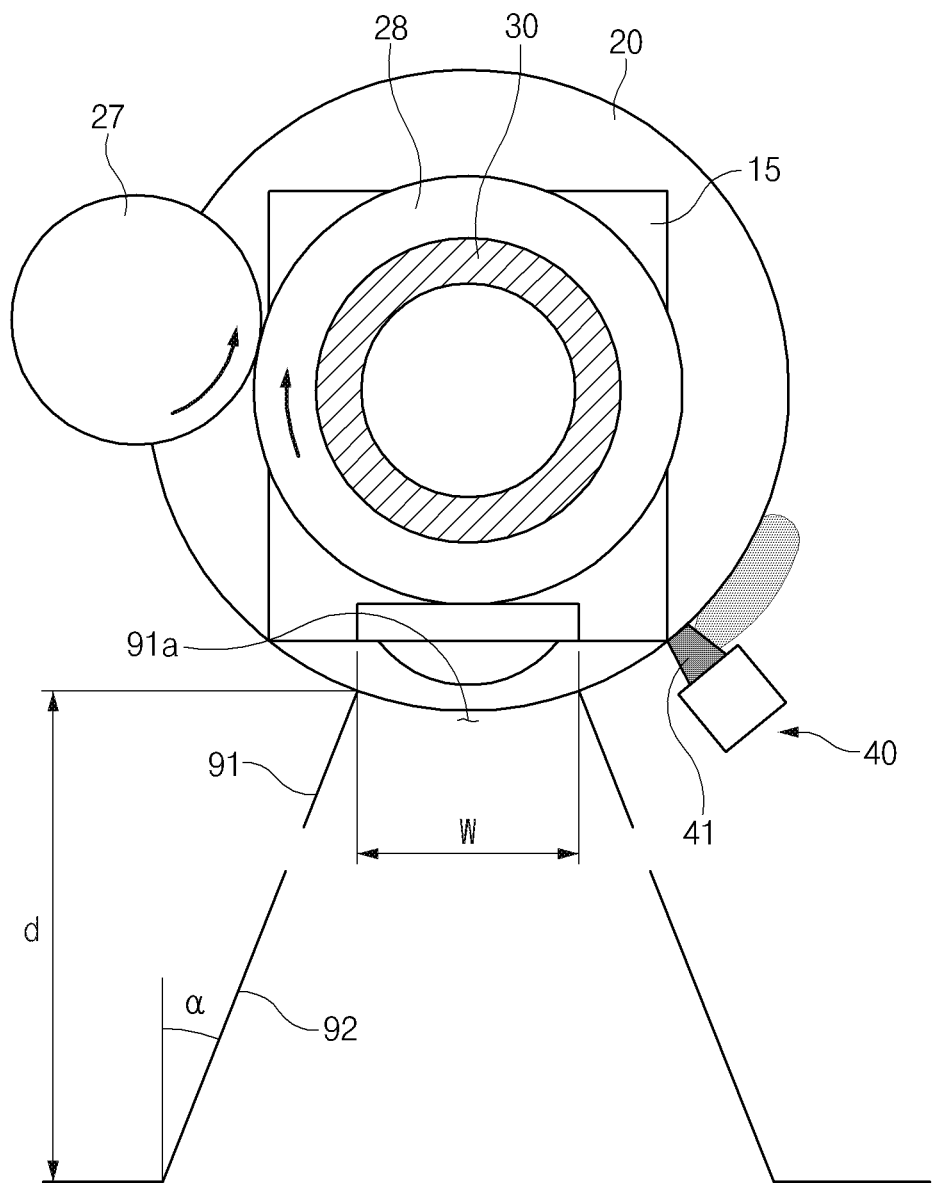
FIG. 25 illustrates a plan cross-sectional view of a glare shutter in a sensing apparatus in one form of the present disclosure.

Referring to FIG. 25, the internal shutter 91 may have an opening 91a adjacent to the lens 16, and the opening 91a of the internal shutter 91 may have a width w corresponding to the outer diameter of the lens 16. The internal shutter 91 and the external shutter 92 may be inclined at a predetermined left and right cutoff angle α. The internal shutter 91 and the external shutter 92 may have a predetermined cutoff length d.

Figure 26:
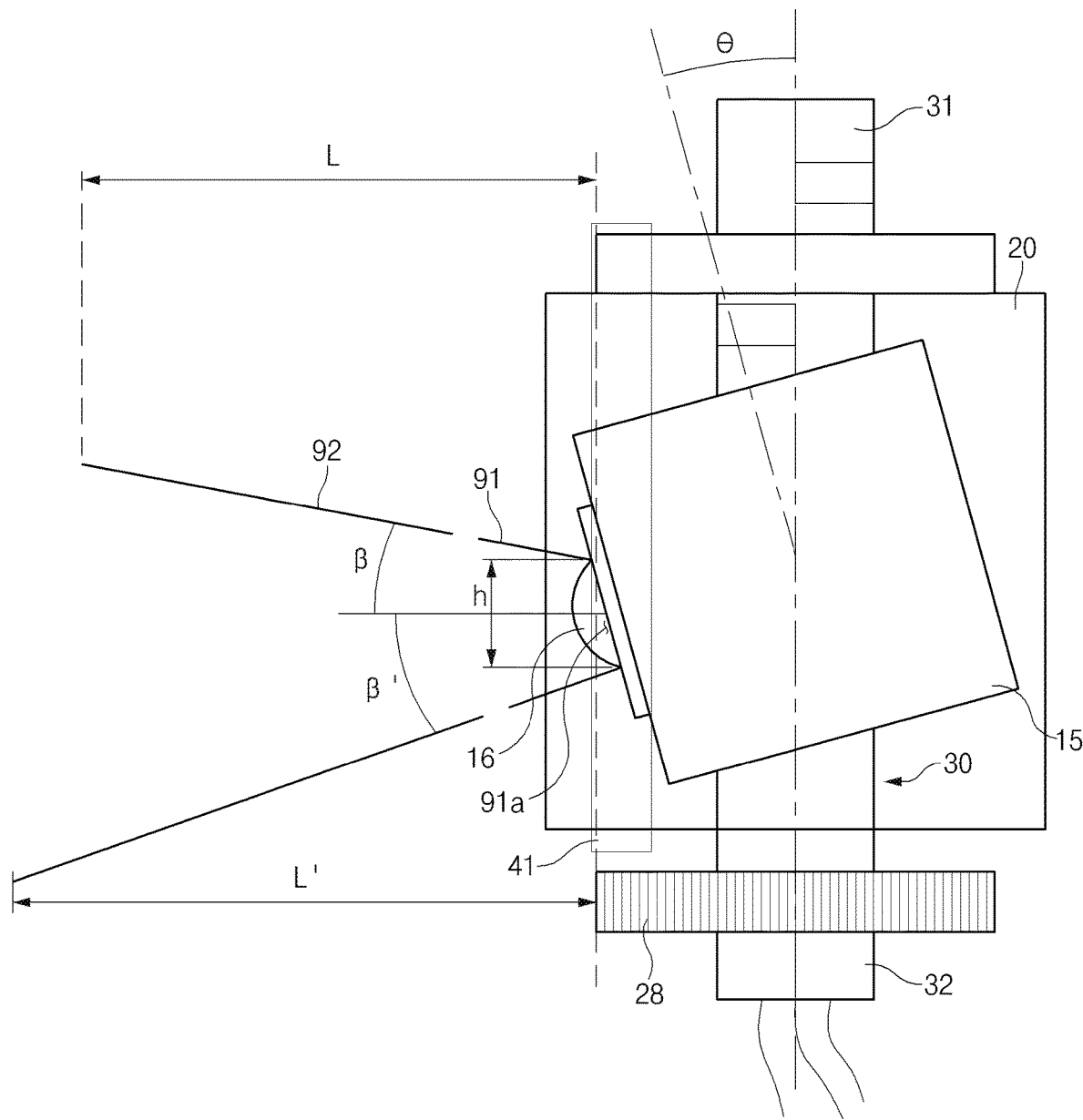
FIG. 26 illustrates a side cross-sectional view of a glare shutter in a sensing apparatus in one form of the present disclosure.

Referring to FIG. 26, the opening 91a of the internal shutter 91 may have a predetermined height h. The internal shutter 91 and the external shutter 92 may have a predetermined upper cutoff angle β and a predetermined lower cutoff angle β'. The internal shutter 91 and the external shutter 92 may have a predetermined upper cutoff length L and a predetermined lower cutoff length L'. The axis of the sensor module 15 may be tilted with respect to the axis of the hollow shaft 30 at a predetermined tilting angle θ.

Figure 27:
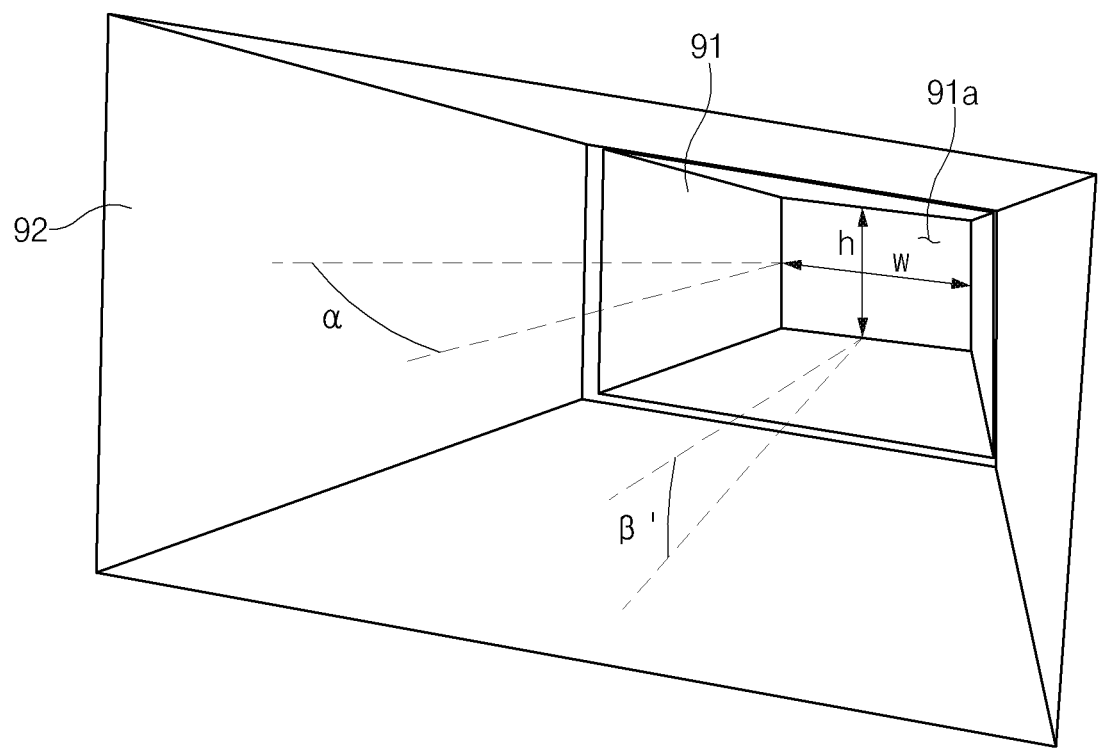
FIG. 27 illustrates a perspective view of a glare shutter in a sensing apparatus in one form of the present disclosure.

FIG. 27 illustrates the glare shutters 91 and 92 having a pyramidal shape. However, the glare shutters 91 and 92 may have various shapes such as a cone shape.

The above-mentioned parameters such as the shape of the internal shutter 91, the shape of the external shutter 92, the width w and height h of the opening 91a of the internal shutter 91, the left and right cutoff angle α, the cutoff length d, the upper cutoff angle β, the lower cutoff angle β', the upper cutoff length L, the lower cutoff length L', and the tilting angle θ may be varied according to the position of the sensor module 15 and the size of the sensor housing 20.

Figure 28:
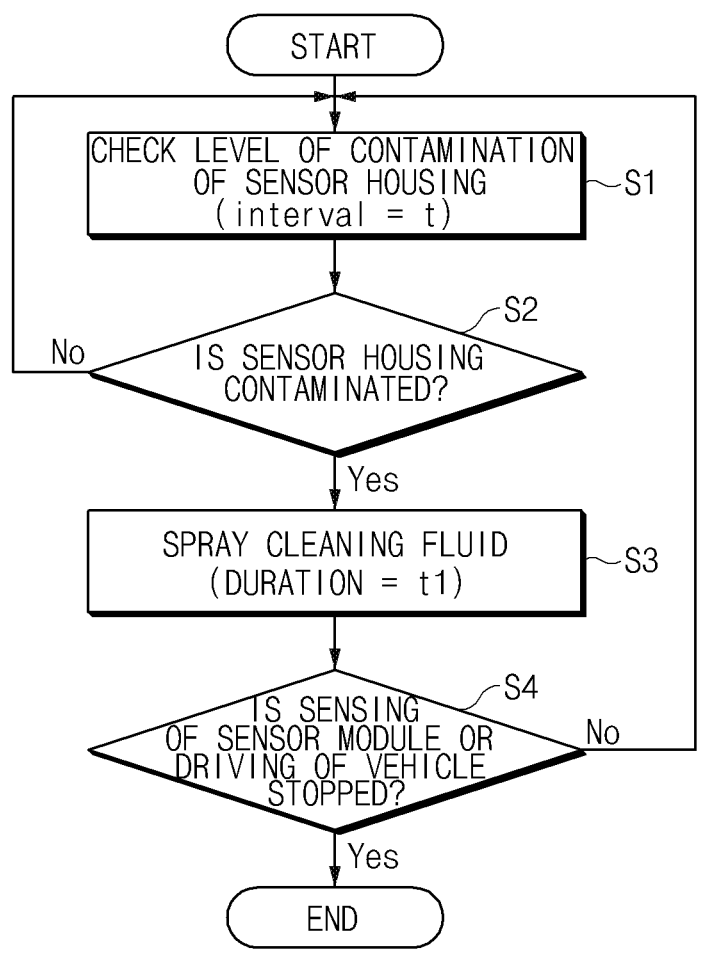
FIG. 28 illustrates a flowchart of a cleaning method of a sensing apparatus in one form of the present disclosure.

FIG. 28 illustrates a flowchart of a method for cleaning the sensor housing 20 using various sensors detecting contamination of the sensor housing 20.

A level of contamination of the sensor housing 20 may be checked at a predetermined time interval t (S1), and it may be determined whether or not the sensor housing 20 is contaminated (S2).

When it is determined that the sensor housing 20 is contaminated, a cleaning fluid may be sprayed to the surface of the sensor housing 20 by the spray mechanism 50 during a predetermined first duration time t1 (S3).

Thereafter, it may be determined whether or not the sensing of the sensor module 15 or the driving of the vehicle is stopped (S4).

Figure 29:
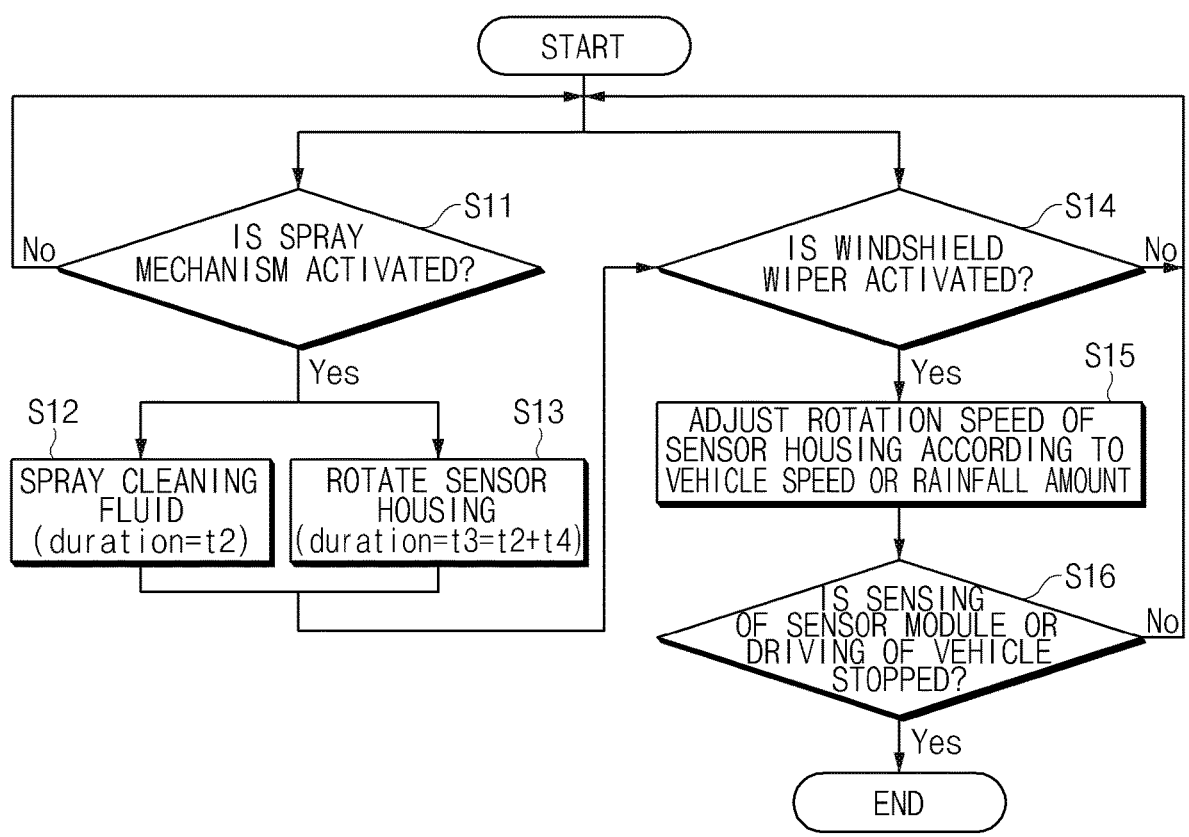
FIG. 29 illustrates a flowchart of a cleaning method of a sensing apparatus in one form of the present disclosure.

FIG. 29 illustrates a flowchart of a method for cleaning the sensor housing 20 by the sensing of a rain sensor or an operator's manual operation.

It may be determined whether or not the spray mechanism 50 is activated by the rain sensor or the operator (S11). The rain sensor is a sensor that is activated by rainfall to detect rain.

When the spray mechanism 50 is activated, a cleaning fluid such as a washer fluid or air may be sprayed from the nozzle 51 during a predetermined second duration time t2 (S12). Here, the second duration time t2 may be a time during which the operator continues pressing a spray control button.

Then, the sensor housing 20 may rotate during a predetermined third duration time t3 (S13). Here, the third duration time t3 may be the sum of the second duration time t2 and a predetermined additional time t4 (t3=t2+t4).

Simultaneously with the activation of the spray mechanism 50 or immediately after the activation of the spray mechanism 50, it may be determined whether or not a windshield wiper is activated by the rain sensor or the operator (S14).

When the windshield wiper is activated, a rotation speed of the sensor housing 20 may be adjusted according to a vehicle speed or an amount of rainfall detected by the rain sensor (S15).

Thereafter, it may be determined whether or not the sensing of the sensor module 15 or the driving of the vehicle is stopped (S16).

The sensing apparatus in some forms of the present disclosure may be mounted in various positions of the vehicle for various purposes, functions, and the like.

For example, the sensing apparatus in some forms of the present disclosure may be applied to an optical sensor mounted on a grille at a front end of a vehicle, such as a front camera for surround view monitor and/or a night vision system.

As another example, the sensing apparatus in some forms of the present disclosure may be applied to an optical sensor attached to the top of a windshield of the vehicle, such as a front camera (lane keeping assist system camera), lidar, and/or radar.

As another example, the sensing apparatus in some forms of the present disclosure may be applied to an optical sensor mounted at the bottom of the front end of the vehicle for autonomous driving, such as lidar.

As another example, the sensing apparatus in some forms of the present disclosure may be applied to an optical sensor mounted on the side of the vehicle, such as a camera mirror system (CMS) and/or a surround view monitor (SVM).

As another example, the sensing apparatus in some forms of the present disclosure may be applied to an optical sensor mounted on a rear end of the vehicle, such as a driving rear view camera (DRM) and/or a surround view monitor (SVM).

As another example, the sensing apparatus in some forms of the present disclosure may be applied to an optical sensor mounted on the side of the vehicle, such as a camera mounted on a B-pillar for autonomous driving.

As set forth above, the sensing apparatus in some forms of the present disclosure may actively remove the foreign material attached to the sensor assembly, thereby ensuring the reliability of sensing performance and extending the range of application thereof.

In addition, the sensing apparatus in some forms of the present disclosure may effectively remove the foreign material attached to the transparent sensor housing surrounding the sensor module, thereby reducing the misrecognition of the optical sensor such as the camera, the radar, and/or lidar, and increasing reliability, and thus it may be easily applied to securing visibility, driving assistance, autonomous driving, etc.

Furthermore, the sensing apparatus in some forms of the present disclosure may have a self-cleaning ability with respect to external contamination, thereby reducing the misrecognition of the sensor module and achieving improved sensing performance. In case of contamination, as the sensor housing surrounding the sensor module rotates, the foreign material blocking the viewing angle of the sensor module may be removed by the wiper in real time so that the sensing performance of the sensor module may be secured. The sensor housing may protect the sensor module, thereby inhibiting direct hit by external loads such as raindrops.

In some forms of the present disclosure, the wiper may be replaced periodically, so it may be easy to continuously secure high performance. The self-cleaning ability may be achieved by the spray mechanism that sprays the cleaning fluid or the heating wire.

In some forms of the present disclosure, the hollow shaft may be provided with the air vent so that the fog/frost on or freezing of the sensor module and the sensor housing may be effectively inhibited.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sensing apparatus, comprising:
   a casing;
   a sensor assembly mounted in the casing; and
   a wiper assembly disposed around the sensor assembly.

2. The sensing apparatus according to claim 1, wherein the sensor assembly includes a sensor module and a sensor housing surrounding the sensor module.

3. The sensing apparatus according to claim 2, wherein the sensor housing is rotatably mounted in the casing.

4. The sensing apparatus according to claim 2, wherein the sensor housing is rotatably supported with respect to a hollow shaft in the casing, and
   the hollow shaft is mounted in the casing.

5. The sensing apparatus according to claim 4, wherein the sensor module is coupled to the hollow shaft, and
   the hollow shaft has a cavity.

6. The sensing apparatus according to claim 5, wherein the hollow shaft has:
   a first air vent communicating with an interior space of the casing, and
   a second air vent communicating with a cavity of the sensor housing,
   wherein the first air vent and the second air vent communicate with each other through the cavity of the hollow shaft.

7. The sensing apparatus according to claim 4, wherein the sensing apparatus further comprises:
   a heating wire mounted on at least one of the hollow shaft or the sensor module.

8. The sensing apparatus according to claim 2, wherein the sensor module has a lens for securing a viewing angle,
   the casing has an opening with which the lens is aligned, and
   a diameter of the opening is greater than a diameter of the lens.

9. The sensing apparatus according to claim 8, wherein the sensing apparatus further comprises:
   a glare shutter disposed around the lens of the sensor module,
   wherein the glare shutter is an inclined wall which is inclined from the lens toward an outside of the casing.

10. The sensing apparatus according to claim 9, wherein the glare shutter includes:
    an internal shutter located inside the sensor housing, and
    an external shutter located outside the sensor housing.

11. The sensing apparatus according to claim 2, wherein the sensor module comprises:
    a plurality of sensor modules which are arranged in series or in parallel in the sensor housing.

12. The sensing apparatus according to claim 1, wherein the casing has a drain hole through which an outside material removed by the wiper assembly is discharged.

13. The sensing apparatus according to claim 1, wherein the wiper assembly includes a wiper removing an outside material attached to a surface of the sensor housing, and a wiper frame on which the wiper is mounted.

14. The sensing apparatus according to claim 13, wherein the wiper frame has a drain slot through which the outside material removed by the wiper is discharged.

15. The sensing apparatus according to claim 13, wherein the sensing apparatus further comprises:
    a spray mechanism configured to spray a cleaning fluid to the sensor housing,
    wherein the wiper frame has an opening through which the cleaning fluid sprayed by the spray mechanism passes.

16. The sensing apparatus according to claim 13, wherein the wiper assembly includes a plurality of wipers arranged in a rotation direction of the sensor housing.

17. The sensing apparatus according to claim 13, wherein the wiper frame extends in a circumferential direction of the sensor housing, and the wiper frame is spaced apart from an exterior surface of the sensor housing in a radial direction.

18. The sensing apparatus according to claim 13, wherein the casing has a pressing projection which presses the wiper toward the sensor housing.

\* \* \* \* \*